United States Patent [19]

Baum et al.

[11] Patent Number: 5,577,105
[45] Date of Patent: Nov. 19, 1996

[54] TELEPHONE CALL ROUTING AND SWITCHING TECHNIQUES FOR DATA COMMUNICATIONS

[75] Inventors: Marc S. Baum; Robert C. Suffern, both of Chicago; Donald Balton, Skokie; Daniel L. Schoo, Island Lake; Peter P. Jankus, Chicago; Lih-Shyng Tzeng, Arlington Heights; Terrel Jones, Des Plaines, all of Ill.

[73] Assignee: U.S. Robotics, Inc., Skokie, Ill.

[21] Appl. No.: 212,515

[22] Filed: Mar. 11, 1994

[51] Int. Cl.$^6$ .................................................. H04M 11/00
[52] U.S. Cl. .................................... 379/93; 379/98; 379/97
[58] Field of Search ................................. 379/93, 91, 94, 379/95, 96, 97, 98, 100, 201, 355, 142; 375/222

[56] References Cited

U.S. PATENT DOCUMENTS

| | | | |
|---|---|---|---|
| 4,747,127 | 5/1988 | Hansen et al. | 379/93 |
| 4,788,657 | 11/1988 | Douglas et al. | 379/98 |
| 4,796,292 | 1/1989 | Thomas | 379/91 |
| 4,942,598 | 7/1990 | Davis | 379/142 |
| 5,163,086 | 11/1992 | Ahearn et al. | 379/91 |
| 5,199,071 | 3/1993 | Abe et al. | 379/98 |
| 5,220,560 | 6/1993 | Ogasawara | 379/94 |
| 5,315,641 | 5/1994 | Montgomery et al. | 379/93 |
| 5,402,474 | 3/1995 | Miller et al. | 379/91 |
| 5,410,754 | 4/1995 | Klotzbach et al. | 370/85.13 |

OTHER PUBLICATIONS

M. Pecan, A Bi-Directional Wire-Line to Local Area Network Interface Module: Summary of Functional Requirements and Fundamental Architecture (Jan. 18, 1994).

M. Pecan et al., A Bi-Directional Wire-Line to Local Area Network Interface and Method: Prototype Specifications (Aug. 10, 1993).

*Primary Examiner*—Jason Chan
*Attorney, Agent, or Firm*—Banner & Allegretti, Ltd.

[57] ABSTRACT

A method of processing incoming digital telephone calls from remotely located call originators which are destined for receipt by a host computer system. The host computer system is linked to the telephone network by a network access server. The call originators may be any type of data terminal, such as a personal computer or a credit card swipe, which is connected to a modem. The network access server extracts control signals imparted onto the telephone line and correlates the control signals with particular communications, routing or applications protocols identified with the call originators. The modem in the network access server which answers the call is configured during the call connect process and placed in a compatible format for the communications protocol of the incoming call. This dynamic custom configuration of the modem reduces the overall telephone call connection and processing time. The control signals may also be used by network access server for customized call routing or by the network access server or host computer system to run specialized application programs. The method is particularly suitable for use by large enterprises handling a high volume of incoming calls in which data is transmitted to the host computer system according to a variety of different communications protocols, or where the implementation of different routing paths or applications programs is desireable according to the identity or classification of the call originator.

5 Claims, 18 Drawing Sheets

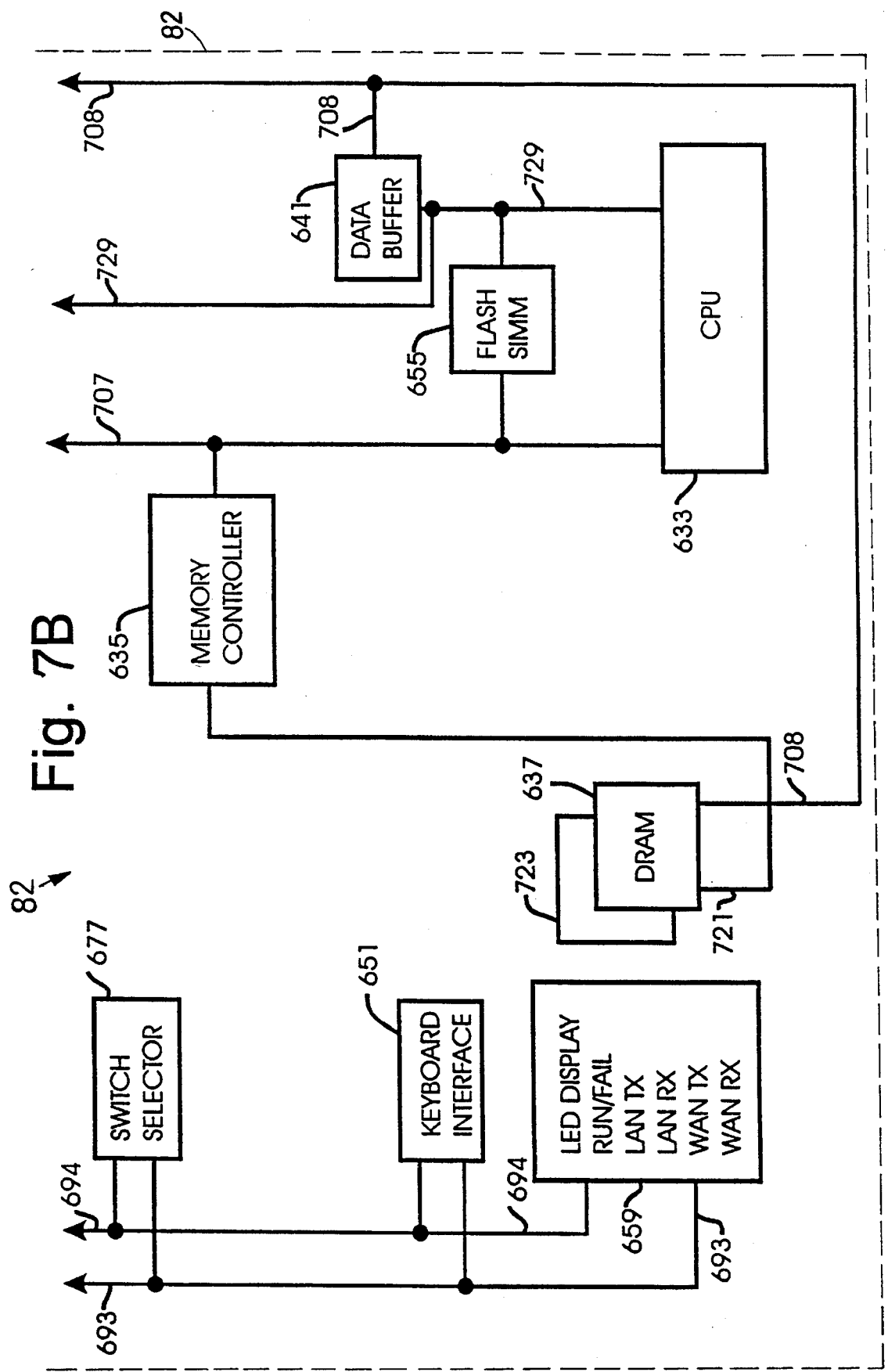

INCOMING CALL FROM TELEPHONE COMPANY NETWORK APPLICATION

Fig. 13
Command Control Block (CCB)

| | | | |
|---|---|---|---|
| +0 | Signature CCB_SIG | | |
| +4 | Command Code CCB_CMD | Modem ID CCB_MID | Flags CCB_FLAGS |
| +8 | CBX Address CCB_CBX | | |
| +12 | CBX Address CCB_CBX | Next CCB Address CCB_CCB | |
| +16 | Next CCB Address CCB_CCB | | |
| +20 | DE CCB_DE | RC CCB_RC | RCX CCB_RCX |

Fig. 14
Command Block Extension (CBX)

| | | |
|---|---|---|
| +0 | Flags CBX_Flags | Byte Count (of data or FOB) CBX_BCOUNT |
| +4 | Address of XMIT/RECV Buffer or FOB CBX_BUFF_FOB | |
| +8 | CBX_BUFF_FOB | Timer-1 CBX_Timer1 |
| +12 | Timer-1 CBX_Timer1 | Timer-2 CBX_Timer2 |
| +16 | Timer-2 CBX_Timer2 | Not Used |

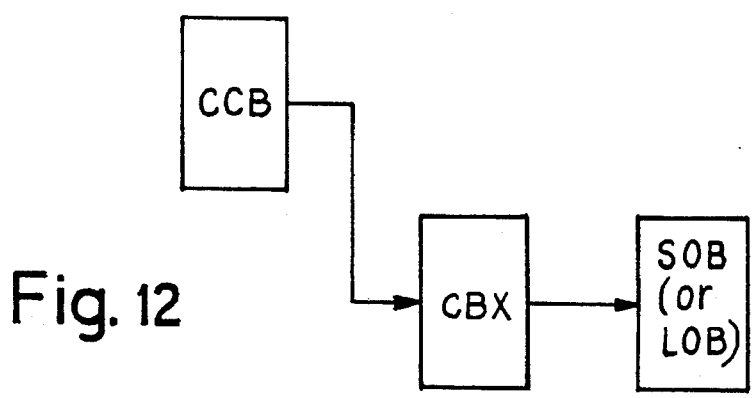

Fig. 12

Fig. 15
Listen 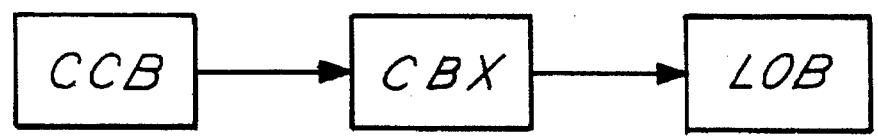
Set Mode 
Answer 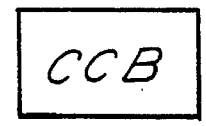

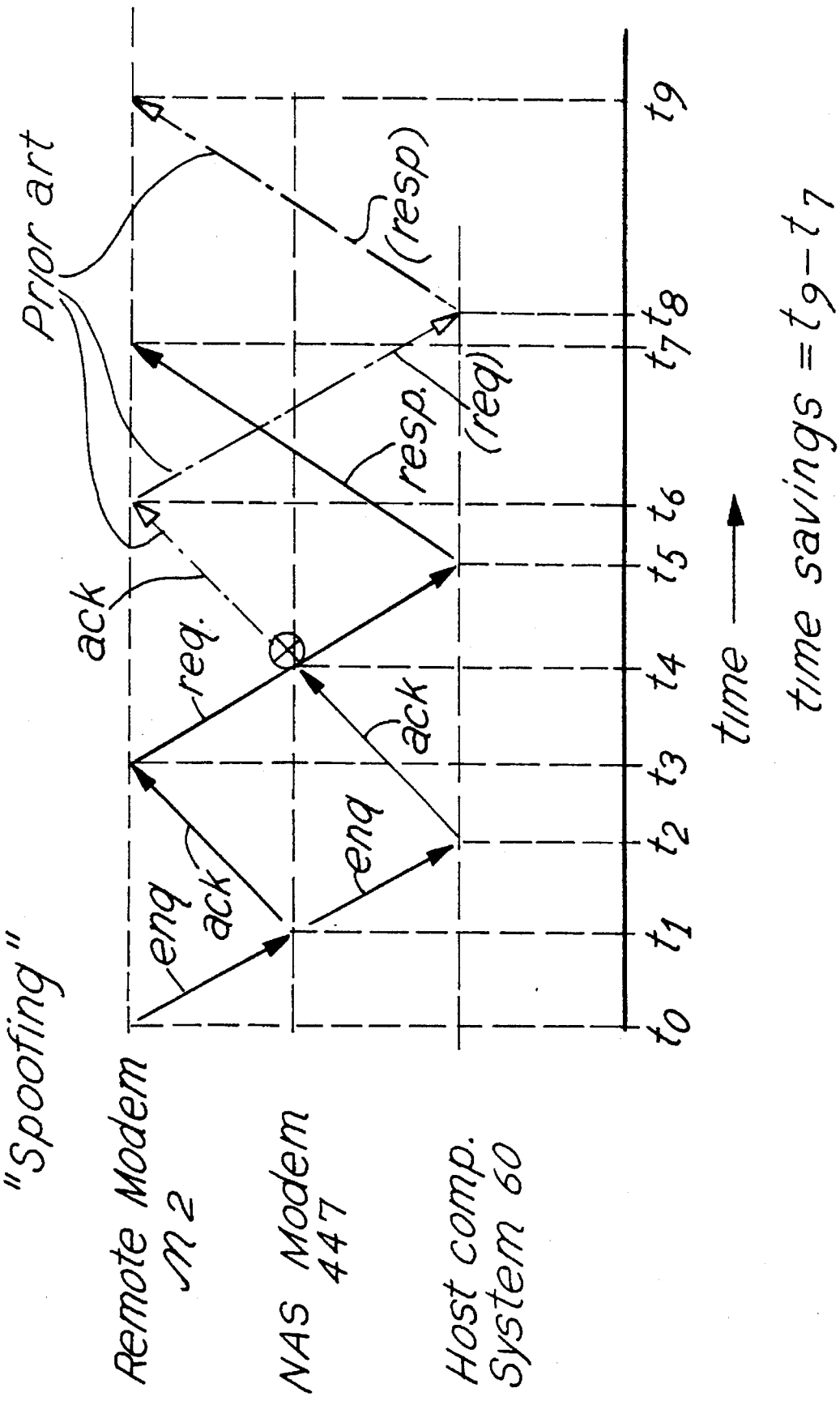

TELEPHONE CALL ROUTING AND SWITCHING TECHNIQUES FOR DATA COMMUNICATIONS

BACKGROUND OF THE INVENTION

A. Field of the Invention

This invention relates generally to the fields of telecommunications, and the processes by which telephone calls are switched and routed into a computer system. More particularly, the invention relates to methods for processing telephone calls which originate from remotely located computers or other data terminals (referred to herein as call originators), and which are destined for receipt by a host computer system.

The invention has applications in both commercial and governmental settings. The invention is particularly suitable for use in applications in which the host computer system receives incoming calls from call originators that are equipped with modems that operate according to various different communications protocols. One example would be where the host computer system is the computer system operated at the headquarters of a chain of retail stores, and where the stores are distributed over a wide area. In this example, the call originators could be, for example, credit card swipe machines and electronic cash registers located in the various stores. The methods disclosed herein are performed by an element of communications equipment we have called a "network access server", which is connected to the host computer system via a network. The network access server receives the incoming calls and routes them to the host computer system in an efficient manner using the techniques of our invention.

B. Description of Related Art

Computers and other terminals that generate digital data presently have the ability to transfer files of information to a remote host computer over the public telephone network. The device that permits this function to be performed is a modem, one of which is placed at the remote data terminal and another of which is placed at the host computer. A modem is a device that modulates the digital data onto to an analog telephone line at the remote location and demodulates the data from the telephone like at the host computer, extracting the digital data.

For an individual or business that owns a single computer, a single modem will ordinarily be all the equipment that the individual or business needs to interface the computer with remote computers to receive incoming data communications. For most business and governmental institutions, however, much more is required in terms of communications equipment. Large businesses, such as the national retail chain referred to previously, may typically have to have the capability of both receiving perhaps hundreds of incoming calls at any one time originating from remote computers or data terminals, and also routing those calls to various different computers arranged in a local or wide area network. Obviously, much more sophisticated communications equipment is required for such large scale operations.

A problem that arises in such large scale operations is that the calls are incoming from a wide variety of types of data terminals, and the modems connected to the data terminals may operate according to a wide variety of different communications protocols. Referring again to our example of the large business, the call originators may include a credit card swipe terminal and its associated modem, electronic cash registers which are also linked to a modem, and perhaps a network of computers located in regional offices that are linked by modems to the telephone system which are used for periodically forwarding sales or inventory reports to the headquarters. Among this set of call originators, the credit card swipe terminals may communicate according to the 300, 1200 and 2400 baud V.22 bis asynchronous protocols. The cash registers may communicate according to the Bell 208B 4800 baud half duplex synchronous or V.32 bis protocol. The computers at the regional offices may also use different communications protocols. In order for a prior art network access server to handle these various communications protocols, it has to go through time-consuming handshaking routines at the start of each call to determine which communications protocol is being used by the call originator, and then configure the modem accordingly. When the costs of computer access time and long distance call time are considered, this extra cost becomes a burden on the profitability of the business. If the business processes millions of calls per year, these costs can become very significant.

In recent years, the trend in telecommunications has been to design equipment that decreases the call connection and transmission time, with a goal being to reduce costs. One change that has been implemented is the installation of digital telephone communications lines, such as the so-called T1 digital system. This system is a 24-voice channel, 1.544 Mb/s, time division multiplexed carrier system. General background information on this system is located in the Electronic Engineers' Handbook, ch. 22 (3rd Edition, 1989), which is incorporated by reference herein. This system permits rapid transmission rates and the stacking of multiple data channels into a single trunk. The T1 system, and other digital systems such as the ISDN system, are preferred data transmission modes by entities which handle a large volume of incoming calls from data terminals, principally because of the high data transmission rate.

One feature which is available with T1 digital telephone service is that the telephone company has the capability of placing control signals onto the telephone line at the beginning of the call. These control signals, which at the present time are typically in the form of multifrequency tones (discussed in detail below), are presently used to identify the carrier access code, which is the number dialed by the call originator. This service is presently known as Feature Group B service. An additional telephone company service, known as Feature Group D, imparts other control signals, again in the form of multifrequency tones, that are identified with the telephone number assigned to the call originator. The technique is similar to the concept of "caller id." Besides multifrequency tones, other types of control signals can be imparted onto the telephone line, such as ISDN and out-of-band signalling techniques. Techniques are becoming available whereby a remote computer user may input control signals directly into the telephone line.

The present invention describes techniques for making novel and advantageous use of these control signals to further reduce the transaction processing and communication time, and/or to permit the network access server to make customized use of these signals. Briefly, in an important aspect of the invention, the invention makes use of the control signals by correlating the control signals to different communications protocols used by the various call originators. The control signals are used to configure the network access server prior to the completion of the call connect process, resulting in significantly reduced communication connection and processing times. The invention further permits the host computer system to process and make use of the control signal in parallel while the call setup and modem configuration process is being performed. In another aspect of the invention, the network access server extracts the control signals and uses the control signals to run specific applications programs (e.g., to do data base look-ups, to set up specific menu screens) or other activities on a customized basis, all based on the extracted control signal. The invention is also capable of performing customized routing of the incoming calls based on the control signals extracted from the incoming call.

Another example of prior art techniques to speed transaction time in credit card processing is the use of high speed asymmetrical communications technologies. An advanced version of this technique, invented by Dale Walsh and Clifford Wallach, is explained in their U.S. Pat. No. 4,890, 316, which is assigned to U.S. Robotics, Inc., the assignee of the present invention. Briefly, this technique involves the recognition that during the first part of a credit card transaction call when the request is being sent, the modem for a call originator credit card terminal sends a relatively large amount of information to the called modem at the host computer system during the credit card transaction call. During this part of the call, only a small amount of information is sent the other way. When the acknowledgement is sent from the host computer system to the credit card modem, the remote credit card modem has very little information to transmit, while the modem at the host computer has a relatively large amount of information to transmit. In the invention of the '316 patent, the credit card modem transmits the credit card request at a very high data rate, while the host modem simultaneously transmits information in the opposite direction at a very low rate. After the credit card request is transmitted, the transmission rates reverse so that the host computer modem transmits at a very high rate, and the credit card modem transmits at a lower rate. This asymmetrical mode of communication can substantially reduce credit card transaction time. The present invention takes advantage of this prior art technique in a new and unexpected way in an integrated network access server.

Yet another way the prior art has attempted to speed up the communications process is to develop advanced modulation schemes, data compression techniques, and to use faster data transmission rates, which permit larger blocks of data to be transferred per second to the host computer system. The present invention provides improved call processing techniques that permit a network access server to adapt to such advanced modulation techniques, and to adapt to new modulation schemes that are developed in the future, thereby taking advantage of improvements in the art as they are made.

Because the invention is applicable to a variety of call originator equipment and to a variety of host computer systems, some of the terms used herein are given generic meanings. For example, the term "network" refers to the data transmission element that routes the incoming communications from the network access server to the host computer system. A local area network such as a Token ring local area network is just one example of a "network." An RS 232 serial port which couples the network access server to a stand alone computer is also considered to be a separate example of "network." Similarly, the term "host computer system" as used herein is used generically to refer to the computers that are connected to the network, whether they be a mixture of mainframe computers, a group of personal computers, or even a single computer. Similarly, the term "call originator" is a generic term referring to any data terminal which is connected to a telephone line and which calls into the host computer system. Examples of call originators are an electronic cash register, a credit card swipe, a lottery ticket machine located in a convenience store, and a computer terminal. The term "network access server" refers to the communications equipment that contains a modem and interfaces between the incoming telephone lines and the network.

SUMMARY OF THE INVENTION

The present invention is a method for processing incoming communications between remotely located call originators and a computer network. In one principal aspect of the invention, the method is carried out in a communication processing system having a network access server that is linked to the network, and a memory storing a communication protocol parameter which is associated with the incoming communications from the call originators. The method comprises the steps of:

(a) initiating a connection between the call originator and the network access server;

(b) extracting one or more control signals from the incoming communication;

(c) correlating the control signals to the protocol parameters assigned to the control signals; and (d) configuring the network access server according to the protocol parameters. The incoming communication is accordingly routed through the network access server to the network according to the protocol parameter. By performing this method, the overall communication connection and processing time of the incoming communication is significantly reduced, because the call originators and the network access server do not have to go through time consuming handshaking routines to arrive at the proper communications protocol—rather, the network access server is custom configured during the call connect sequence according to the particular protocol parameter(s) for the call. Significantly, the real time configuration of the network access server based on the control signals is accomplished prior to the completion of the call set-up, and therefore does not add to the overall call connection time.

In another aspect of the invention, the extracted control signals are converted to digital data which is alternatively used by the network access server or host computer system to run customized applications programs according to the extracted control signal. For example, if a particular control signal has previously been associated with a particular call originator, or type of call originator (e.g., computers dedicated to high speed file transfers; personal computers located in field offices; cash station machines), the network access server or host system, after extraction of the control signal, may run a particular application program designed for the call originator or type of call originator. The application program may, for example, consist of running a data-base look up, executing a user-friendly or customized menu, executing a security program, running a program that profiles the user for the host computer system, or initiating some other specific applications program. Alternatively, the control signals can be correlated to call routing parameters, enabling the incoming calls to be routed to specific elements of the host computer system. This dynamic, customized use of the control signals may occur in parallel with the configuration of the network access server, or may be performed completely independently of the configuration of the network access server.

When the control signals are used for customized call configuration, the element of the network access server that will typically be configured according to the protocol parameters is a modem, and, in the large scale implementation of the invention, a bank of modems (perhaps 48 in all, but one per call). Each modem is continually reconfigured as calls come in according to the particular communications protocol of the incoming call. The modems are configured to the communications protocol that is compatible with the communications protocol of the call originator for the incoming calls, regardless of what the protocols may be. In this invention, the protocol parameters will typically be the modulation scheme, synchronization scheme, error correction technique, data compression, transmission rate, or other communication parameter that is used by the call originator. Other protocol parameters may include protocol handling techniques, such as framing, filtering, or forwarding. Still other protocol parameters may be associated with high speed asynchronous transmission, or protocol spoofing (discussed below). Thus, when the network access server is configured according to the protocol parameter, it is configured in a manner to match (or at least be compatible with) the communications protocol of the call originator.

In one aspect of the invention, the control signals are preferably (but not necessarily) in the form of multifrequency tones. As noted earlier, the control signals may take on other forms, and the invention is applicable to other techniques, such as those used in the ISDN system, and out-of-band signalling, in which a separate logical channel out of band from the communication channel is used for transmitting control signals. In one aspect of the invention, the control signals are identified with the telephone number of said call originator. Alternatively, the control signals can be in the form of multifrequency tones identified with the telephone number called by the call originator. As a still further aspect of the invention, the control signals are identified with information related to credit card transaction, such as the credit card number.

At the present time, multifrequency tones are imparted onto the telephone line by the telephone company, but techniques are becoming available by which the multifrequency tones (or other control signals) may be imparted onto the line by equipment located at the site of the call originator, for example, the modem assigned to the call originator's data terminal. The particular device that puts the control signals on the line is not particularly important. The particular form in which the control signals take is also not particularly important.

In another aspect of the invention, the network access server further includes a modem and a network application module interfacing between the network access server and the network. In this aspect of the invention, the step of correlating the control signals to the protocol parameters comprises the steps of passing digital data representing the control signal from the modem to the network application module, looking up in the memory the protocol parameters which correspond to the digital data, and then passing the protocol parameters from the network application module to the modem. The modem then configures itself according to the protocol parameters and then receives the incoming communication.

In yet another aspect of the invention, the network application module contains software that is accessible by the host computer system through the network, permitting the host computer system to modify the protocol parameters that are assignable to the control signals. For instance, if a call originator is a credit card swipe terminal connected to a modem, and the modem is upgraded to a faster communications protocol, the user of the system can reprogram the network access server software, so that the network access server will be configured properly and receive incoming calls from that particular modem according to the new protocol.

In still another important aspect of the invention, the network access server has the capability of routing the control signals to the network simultaneously with the configuring of the network access server according to the proper communications protocol. Thus, the network can take the information and, for example, look up in a database the complete profile of the call originator, or even send prompts or messages to the call originator, prior to or contemporaneous with the transmission of the call.

As noted previously, the present invention has wide applicability to commercial and governmental operations, and is particularly useful wherever calls are destined for a network and are originating from data terminals that transmit data according to different communications protocols. The example of the host computer system processing credit card and sales transaction for a nationwide chain of retail stores is one example. Another would be the computer system that processes lottery ticket sales originating at remote locations around a state. The invention permits customized, dynamic (real-time) configuration of the network access server, reduced call connection and processing times, parallel processing of the control signals by the host computer system, and adaptability to upgrades in equipment and improvements in data transmission technology. The invention also permits the network access server to run dynamic application programs on a customized, i.e., call-by-call, basis. The invention further permits a bank of modems in a network access server to act as a virtual modem pool, whereby the modems can be dynamically re-configured and used for many diverse applications.

These, and still further objects, advantages, and features of the invention will become apparent from the following detailed description of presently preferred embodiments of the invention.

BRIEF DESCRIPTION OF THE DRAWINGS

Presently preferred embodiments of the invention are depicted in the drawings, and like reference numerals refer to like elements in the various views, and wherein

FIGS. 7A, 7B and 7C are schematic block diagrams of a network application module of the type shown in FIG. 2;

FIG. 12 is a diagram of the architecture of command blocks which interface between the resident software used to communicate between the modules of the network access server and the host computer system software;

FIG. 13 is a diagram of a command control block of FIG. 12;

FIG. 14 is a diagram if a command extension block which is associated with the command control block of FIG. 13;

FIG. 15 is a diagram of the layouts of the various modem commands supported by the resident software of the network access server;

FIG. 17 is a diagram of the flow of enquire, acknowledge, request and response signals when the "spoofing" technique of the present invention is used in a credit card transaction call.

DETAILED DESCRIPTION OF THE PREFERRED EMBODIMENT

I. System Overview

Figure 1:
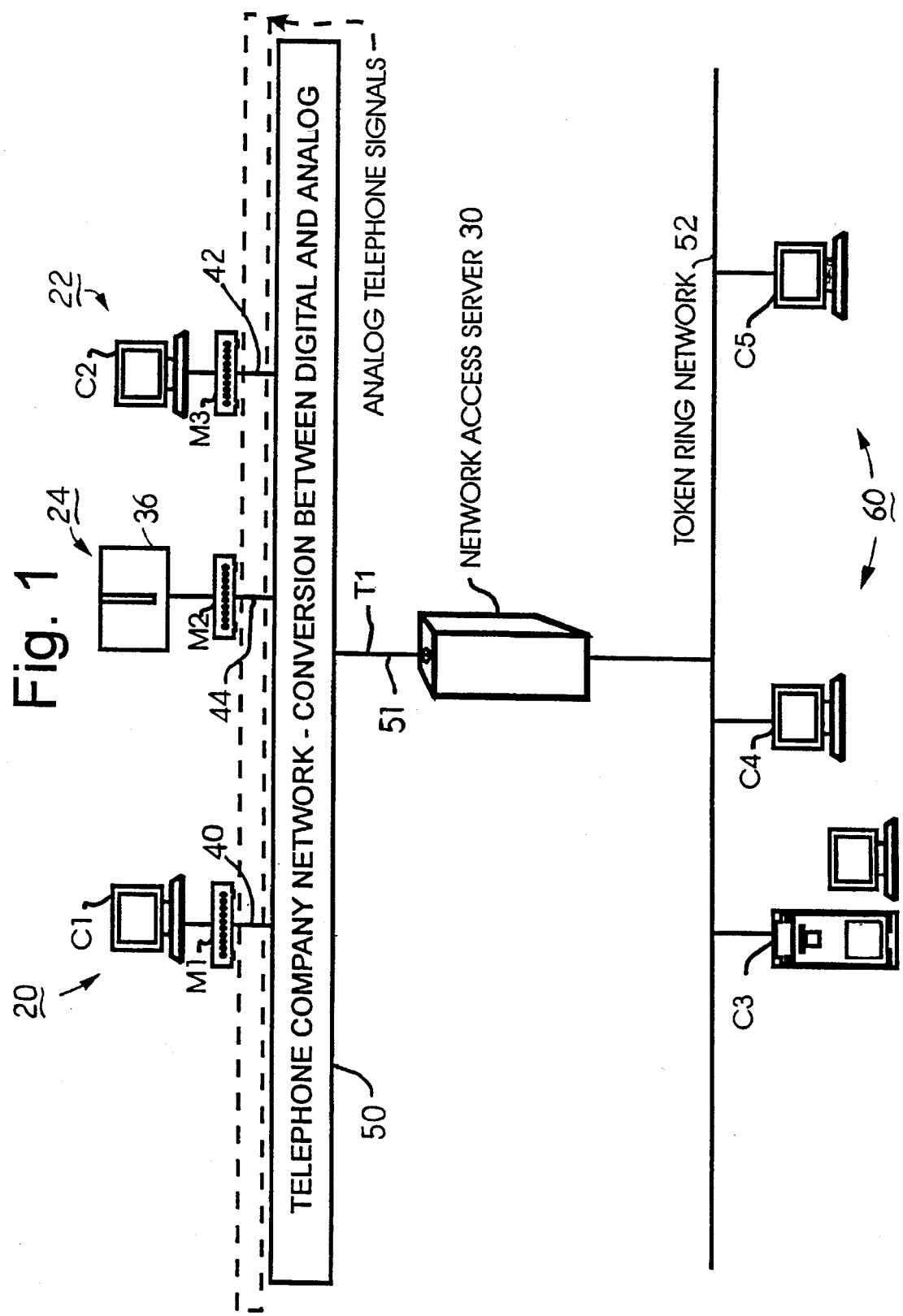
FIG. 1 is a block diagram of the overall communications system in which the invention is implemented, illustrating the relationship between various call originators, a telephone network, a network access server, and a host computer system linked to the network access server via a network.

The present invention is implemented in a communication processing system that is depicted generally in FIG. 1. A plurality of call originators 20, 22 and 24 are located at various remote locations, which transmit incoming communications to a network access server 30. Call originator 20 may consist of a personal computer C1 that generates digital data and transmits the data to a modem M1 which modulates the data onto a telephone line 40. Similarly, call originator 22 may consist of a central computer C2 that is located at a regional office of a business. Computer C2 is linked via a modem M3 to a telephone line 42. Modem M3 modulates digital data from computer C2 onto telephone line 42. The call originator 24 is shown as consisting of a credit card swipe terminal 36 which swipes credit cards, generates digital data concerning the credit card number and the amount of the transaction, and transmits the data to a modem M2 which in turn modulates the data onto a third telephone line 44. For the purpose of this specification, the particular type of call originators is not important, and the call originators of FIG. 1 are chosen for purposes of illustration only.

In this example shown in FIG. 1, the modems M1, M2 and M3 all are assumed to operate according to different communications protocols. For example, let us assume that modem M1 uses the Bell 208B 4800 baud half-duplex synchronous transmission protocol, modem M2 transmits according to the V.32 9600 baud full duplex synchronous transmission protocol, and modem M3 transmits according to the V.22 bis synchronous transmission protocol. Of course, these examples are merely illustrative of possible scenarios.

In FIG. 1, the data that is transmitted onto the telephone lines at 40, 42 and 44 is in analog form. The illustration in FIG. 1 assumes that the communication system makes use of the digital public switched telephone network (PSTN) 50 such as the T1 network mentioned previously. The calls from the call originators are digitized and placed into one of the 24 multiplexed channels of the four-wire T1 span line 51 by the telephone company and fed into the network access server 30. As used herein, the term T1 span line refers to twenty-four 64 kbps (thousand bit per second) DS0 channels that are multiplexed in the 1.544 Mbps DS1 rate, with each DS0 channel carrying the digital representation of an analog voice channel. The term "trunk", as used herein, refers to a single DS0 channel.

The central office of the local telephone company (not shown) places control signals onto the digital telephone lines 51 at the front end or very beginning of the call according to well known techniques. These control signals, typically in the form of multifrequency tones, are used by the network access server 30 according to the invention to identify the particular communication protocol used by the call originators 20, 22, and 24. For example, where the telephone service known as Feature Group B is used, the multifrequency tones identify the carrier access code of the number that is dialed by the call originators. As another example, if the service known as Feature Group D is used, the multifrequency tones may identify both the carrier access code of the called number as well as the telephone number of the call originator. The use and processing of these control signals by the network access server 30 is discussed in greater detail below. Since the three remotely located call originators all transmit data according to different communications protocols, each call originator (or type of call originator) is assigned a different control signal. The control signal is associated with a particular communications protocol parameter at the network access server such that the call from call originator is processed in a more efficient manner. Alternatively, the control signal may be used by the network access server or host system to dynamically run a specific application program customized to the call originator, or to route the call to a specific destination.

The digital signals representing the incoming communications are fed into the network access server 30 by the T1 span line 51 (or possibly two span lines). The network access server 30 configures itself by extracting the control signals from the incoming communication, and correlating the control signals to the proper protocol parameters associated with each incoming call. The network access server 30 then configures itself according to the protocol parameters assigned for each call. The network access server 30 then routes the incoming call onto the network 52 (shown in FIG. 1 as a local area network such as a Token ring local area network). The host computer system 60 then receives the call and processes the calls as needed. The host computer system 60 depicted in FIG. 1 consists of a variety of computers such as a personal computer C4, data storage terminal C5, and mainframe computer C3. As was the case with the call originators 20, 22 and 24, the details of the host computer system 60 and its constituent components, and the network 52, are not particularly important.

II. Network Access Server Detailed Description

Figure 2:
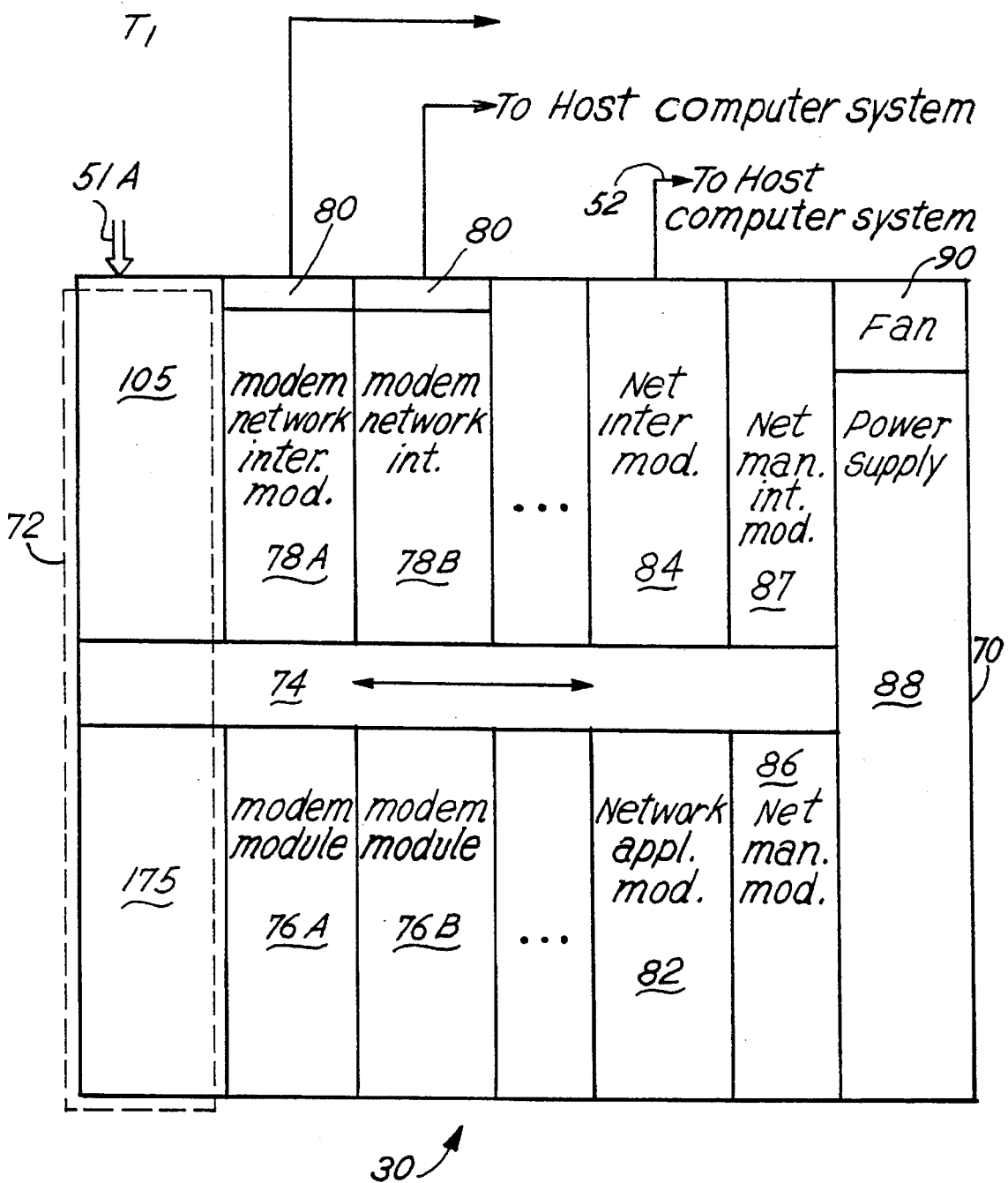
FIG. 2 is a more detailed diagram of the network access server of FIG. 1.

Referring now to FIG. 2, the network access server 30 is shown in a functional block diagram form and will be described in more detail. The network access server 30 has a chassis 70 which houses a telephone interface unit 72 which receives the incoming calls on T1 span line 51, demultiplexes the calls, and routes the calls over a high speed time division multiplexed (TDM) bus complex 74 to 12 modem modules 76A, 76B, etc. Each modem module 76 has four modems (not shown in FIG. 2) which demodulate the incoming calls. Thus, if there are two T1 span lines 51 incoming to the network access server 30, there are 48 modems in all for the 48 DS0 channels incoming into the network access server 30. The connections on the TDM bus complex between the telephone interface unit and the modems are static or "nailed up" connections, and are established on power-up of the network access server 30. The TDM bus complex 74 carries data back and forth between all of the various modules of the network access server 30. The bus complex 74 is described in greater detail below.

Each modem module 76 is provided with a corresponding modem network interface module 78A, 78B, etc. The modem network interface modules 78 have four sync/async RS 232 ports depicted as block 80. The RS 232 ports 80 are linked to computers of the host computer system and may be used to output the calls from the network access server 30 to the host computer (and thus act as a "network" 52 as that term is used herein).

The network access server 30 also includes a network application module 82 which functions as an interface between the software which governs the operation of the network access server and the software of the host computer system. The network application module 82 has a memory (not shown in FIG. 2) which is used when the control signals are correlated with the protocol parameters for the incoming call. The network application module 82 tells the modems in the modem modules 76 what modulation scheme to use, whether the call is synchronous or asynchronous, and what error correction protocol to follow. The network application module 82 also tells the modem whether to send the calls out the RS 232 ports 80 or whether to send the calls out of the network interface module 84 to the network 52 and host computer system 60. Again, the network application module 82 will also be discussed in detail below. A network management module 86 and network management interface module 87 provides management and supervision functions for the network access server 30.

A power supply module 88 supplying power to all the modules in the incoming call interface is also incorporated into the chassis 70. The power supply module consists of two power supply units that perform ac to dc power conversion, providing full redundancy in the case of failure in one of the units. The power supply units in module 88 are designed according to standard methodologies, and preferably accept 120 or 240 volts AC at 47 to 63 hertz. Each power supply unit should be rated for +5 volts d.c., 35 amps dc; ±12 volts d.c., 3.5 amps d.c.; −5 volts d.c., 2 amps d.c. A high speed cooling fan 90 is provided in the chassis 70 to dissipate heat generated by the power supplies during operation of the network access server. A power on/off switch (not shown) is provided to turn the whole unit 30 on and off.

The chassis 70 is a standard 19" card cage, and has provisions for 16 front-loading application cards and 16 rear-loading interface cards, and a network management module and associated interface module.

A. Telephone Interface Unit 72

Figure 3:
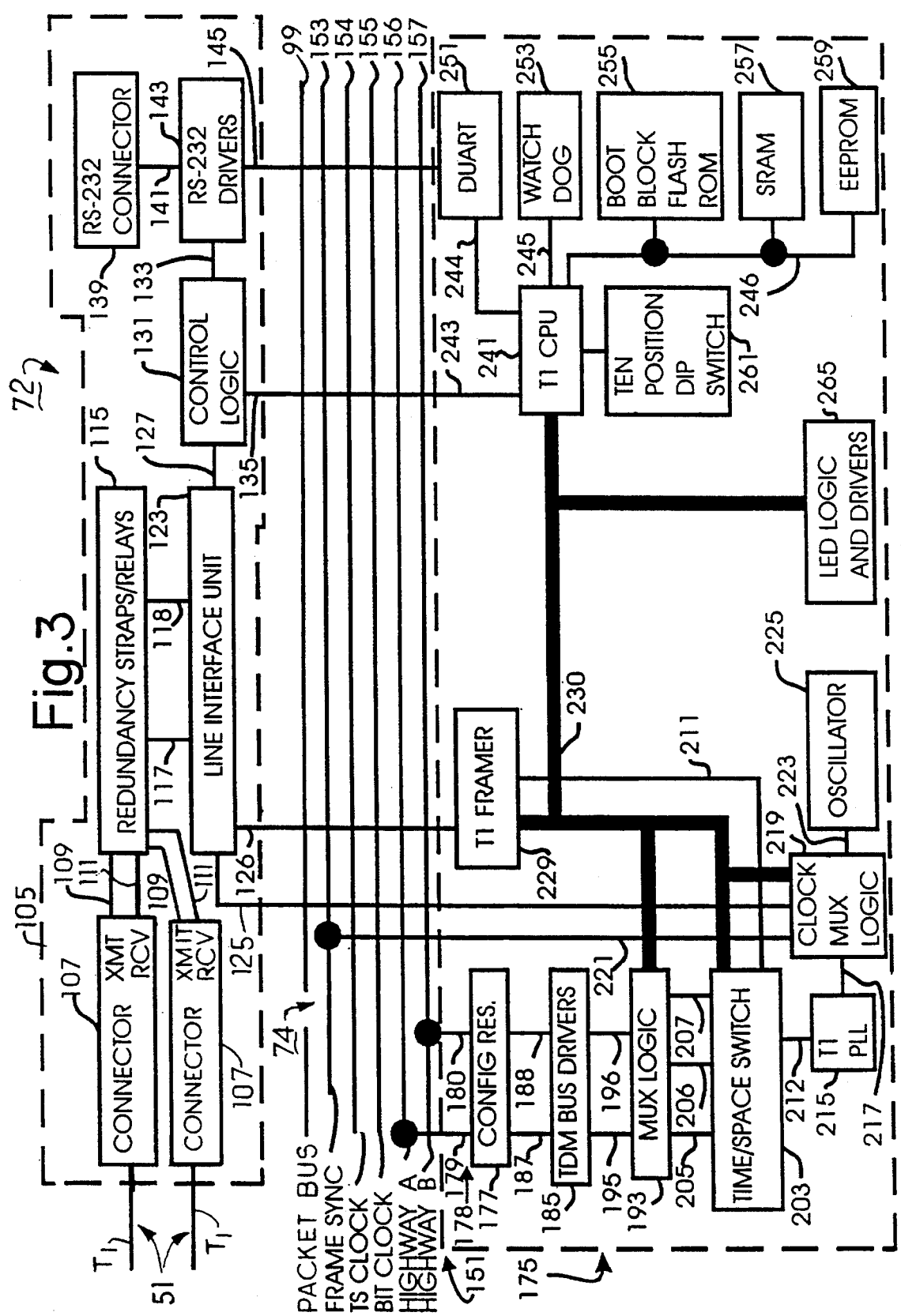
FIG. 3 is a detailed block diagram of a preferred form of a telephone interface unit 72 of the type shown in FIG. 2.

The telephone interface unit 72 of FIG. 2 is shown in greater detail in FIG. 3. The telephone interface unit 72 is composed of two separate modules, an incoming call interface module 105 and an incoming call application module 175. The purpose of interface module 105 is to physically receive the incoming T1 span lines, convert the signal in a digital TTL format, and deliver the signal to the call application module 175. Interface module 105 provides a CSU interface which recovers clock signals and data from the incoming T1 signals, and also provides the transmission of outgoing digital telephone signals representing digital data to line T1. Module 105 is connected to application module 175 via a backplane connector. Application module 175 provides framing of recovered T1 data to extract the T1 DS0 channel data and then switches the channel data to the modem modules 76 via the TDM bus 74.

Referring to FIG. 3, interface module 105 comprises two connectors 107 connected to telephone lines T1, each of which carries 24 channels of digital telephone signals via time division multiplexing. Each of the channels is created by sampling an analog telephone signal 8,000 times per second using eight digital bits per sample.

The connectors 107 transmit the T1 digital telephone signals over conductors 109 and receives such signals over conductors 111. The connectors 107 are modular 8 RJ48 connectors, 4 bantam jacks for monitoring each span's transmit (XMT) and receive (RCV) lines. Redundancy straps and relays 115 provide a redundancy capability and are used for the purpose of switching the T1 signals to another T1 module in the chassis. The digital telephone signals are transmitted over conductors 117 and 118 to a line interface unit 123 which demultiplexes the signals and produces corresponding demultiplexed telephone output signals on a conductor 126 and clock signals on a conductor 125. For outgoing calls, interface unit 123 multiplexes digital telephone signals for transmission by line T1. Unit 123 is controlled by signals received over a conductor 127 from a control logic unit 131 which receives signals over conductors 133 and 135. An RS-232 connector 139 can be connected to an external computer and monitor in order to receive management signals that are passed through a conductor 141 to RS-232 drivers 143. The drivers also supply RS-232 signals over a conductor 145 to application module 175.

Still referring to FIG. 3, the time division multiplex (TDM) bus complex 74 includes a frame sync line 153, a time slot (TS) clock line 154, a bit clock line 155 and data highway lines 156–157. A packet bus 99 is also provided for transmitting communications between the modules of the network access server 30.

The frame sync signal is used to identify the first time-slot in each TDM bus frame. The time slot signal represents the bit clock signal divided by 8. All modules use the TS clock signal to keep track of the current active time-slot. The bit clock signal is the internal TDM bus master clock. All modules accessing the TDM bus use the bit clock to control the transfer of data. The bit clock has a clock frequency of 4.096 Mhz and is derived from the received line interface from telephone network 50 (FIG. 1).

TDM bus 74 operates with standard TTL voltage levels and supports a maximum clock frequency of 4.096 MHz. There exist 64 time-slots during each frame on the TDM bus. During a time-slot, a module will read one octet (8 bits) of data from one of the TDM bus highways, and write one octet of data to the other TDM bus highway. There is no need to distinguish one bus frame on the TDM bus from another bus frame on the TDM bus. There is however a need to distinguish between time-slots on the TDM bus. Therefore, each time-slot numbered 1–64.

The TDM bus 74 provides 8 kilo bytes per second (Kbps) connections between as many as 256 end devices or modules. In order to provide 64 Kbps (full duplex) connections, each end device must be able to transmit and receive one octet (8 bits) every 125 microseconds (us). Therefore, the duration of each frame is 125 us. Since 64 time-slots exist per frame, the period of a time-slot is 1.95 us.

Figure 4:
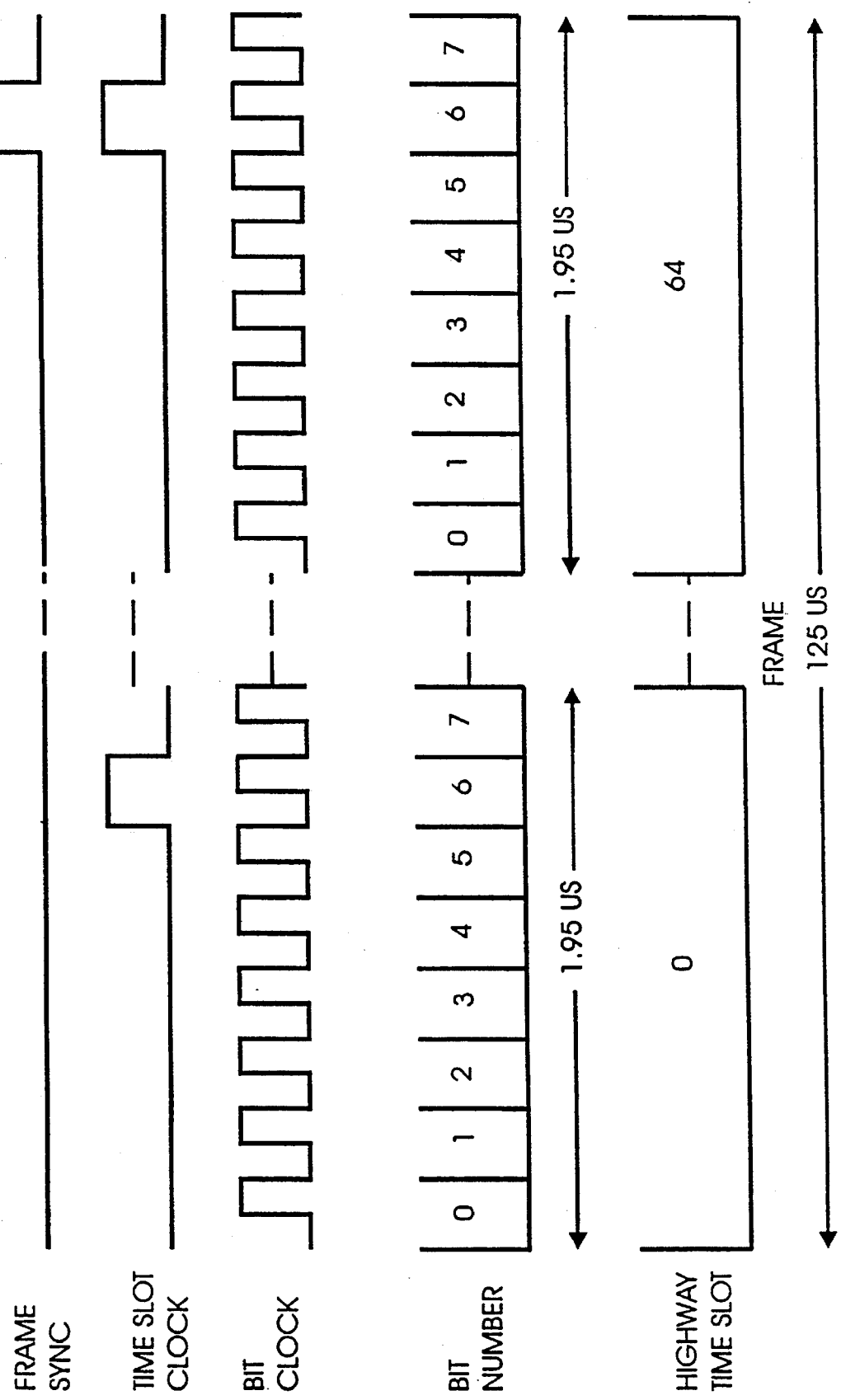
FIG. 4 is a timing diagram showing the relationship of signals appearing on the TDM bus illustrated in FIG. 3.

FIG. 4 shows the relationship between the duration of a TDM bus time-slot, the duration of a TDM bus bit time, the bit clock, TS clock and frame sync signals. Each bit of a data octet will be driven onto the bus at the falling edge of the bit clock, and will be sampled by the receiving module at the rising edge of the bit clock.

As can be seen from FIG. 4, a new bit time begins on each falling edge of the bit clock, and a new time-slot begins on the falling edge of the next bit clock after a TS clock signal. The next bit clock after a frame sync signal identifies the beginning of the first time-slot of a TDM bus frame.

Figure 5:
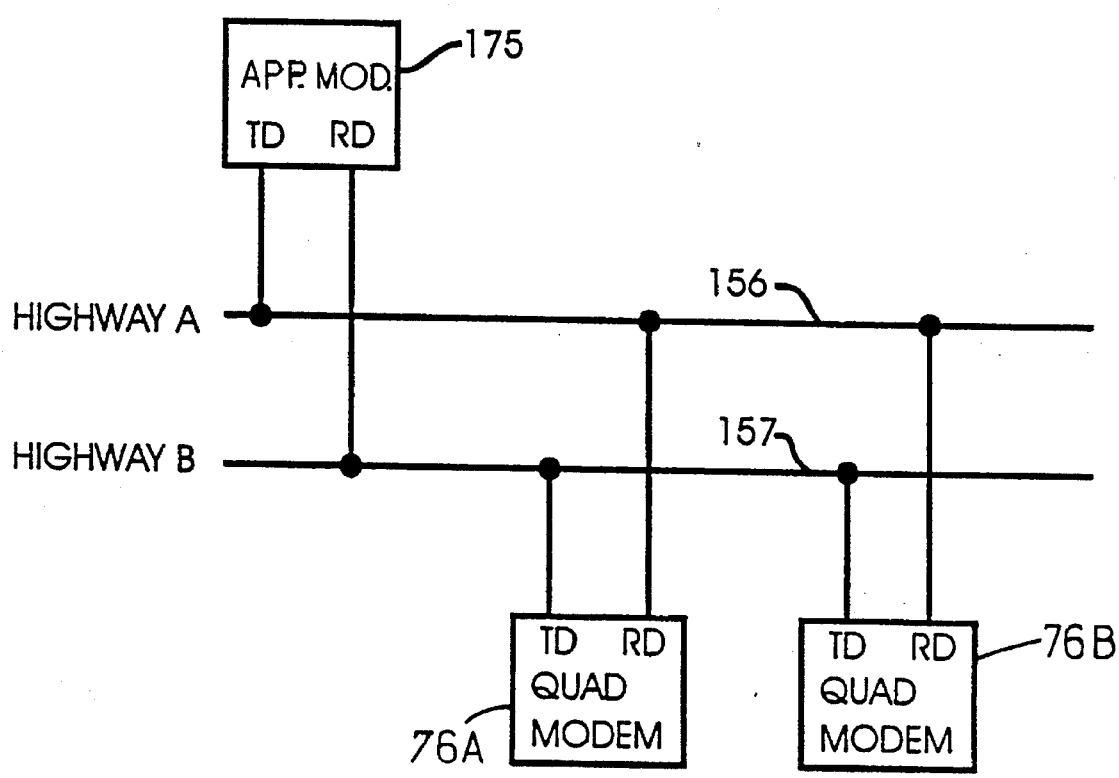
FIG. 5 is a schematic block diagram showing the connection of the application module 175 of FIG. 3 and the modem modules 76 of FIG. 2.

As shown in FIG. 5, data is directly written from the transmit (TD) terminal of application module 175 (FIG. 3) to the receive terminal (RD) of one of the quad modems (e.g., 76A or 76B) and vice versa.

Application module 175 occupies rack slot 1 and assigns DS0 channels 1–24 from one of the two T1 span line to time-slots 1–24 on highways 156–157 of TDM bus 74. The DS0 channels 25–48 from the other incoming T1 span line are assigned to time slots 25–48 on the TDM bus 74. Quad modem modules 76A, 76B, etc. use the time-slots in groups of four and occupy the rack slots as defined in the following chart:

| Physical Slot Nos. | Time-Slot Nos. on TDM Bus | Card Type |
| --- | --- | --- |
| 1 | 1–48 | Application module 175 |
| 2 | 1–4 | Quad modem card 76A |
| 3 | 5–8 | Quad modem card 76B |
| 4 | 9–12 | Quad modem card 76C |
| 5 | 13–16 | Quad modem card 76D |
| 6 | 17–20 | Quad modem card 76E |
| 7 | 21–24 | Quad modem card 76F |

Referring to FIG. 3, network application module 175 includes configuration resistors 177 that are connected as shown over a bus 178 comprising conductors 179–180 to TDM bus 74. Configuration resistors 177 receive/drive signals from TDM bus drivers 185 over conductors 187–188. The bus drivers 185, in turn, receive signals from multiplex logic circuit 193 over conductors 195–196. Logic circuit 193 is controlled by a time/space switch 203 over conductors 205–207. Switch 203 receives a control input over a conductor 212 from a T1 phase lock loop (PLL) circuit 215 that receives input over a conductor 217 from a clock multiplex logic circuit 219. Logic circuit 219, in turn, receives 4.096 MHz clock signals generated by an oscillator 225 over a conductor 223 and receives the frame sync signal over a conductor 221. A T1 framer unit 229 frames telephone signals from line interface unit 123 and makes the resulting data frames available to an 8 bit data bus 230. Framer 229 receives control signals from time/space switch 203 over a conductor 211.

Application module 175 is controlled by a T1 central processing unit (CPU) 241 that controls bus 230 and controls logic circuit 131 over conductor 135. T1 CPU 241 also receives input signals over conductors 244–246 from a DSUART 251, a watchdog timer 253, a boot block flash ROM 255, a SRAM memory 257 and an EEPROM memory 259. T1 CPU 241 also receives inputs from a ten position DIP switch 261. The status of application module 175 is displayed on light emitting diodes (LEDs) that are controlled by a LED logic and drivers unit 265.

T1 CPU 241 uses an Intel 80C186 embedded processor to control all peripherals on application module 175 and telephone interface module 105, including framer 229, time/space switch 203, multiplex logic circuit 193, clock multiplex logic unit 219, bus 230 and LED logic and drivers unit 265. RS-232 connector 139, drivers 143 and DSUART 251 provide an operator with the ability to manage application module 175. T1 CPU 241 initializes all hardware with default values, settings and configurations. These defaults are stored in flash ROM memory 255 and can be altered via a conventional software download.

The memory for application module 175 consists of 512 K of boot block flash ROM 255 and 512K of SRAM 257. EEPROM memory 259 is expandable from 8 K to 65 K. Boot blocked flash ROM 255 has the ability to update the operational code without jeopardizing the BOOT code during a software download. This is an important feature since application module 175 is guaranteed operable code to execute if operation code is lost during software download.

T1 framer 229 is dedicated to the incoming telephone span line T1 and handles all of the T1 receive framing and transmit framing tasks. T1 CPU 241 accesses and controls framer 229 via bus 230. Framer 229 operates in the SF framing mode, and is capable of supporting all framing modes, signaling, line coding and performance monitoring required for interfacing to line T1. The outputs of framer 229 are concentrated highway interface (CHI) compatible which is an AT&T standard. The CHI outputs of framer 229 are wire OR'ed together to time/space switch 203 which switches the T1 DS0 channels to the TDM bus 151 time-slots. Framer 229 receives span line T1 recovered data and clock from line interface unit 123.

The A and B signaling information from the telephone company is decoded by T1 framer 229. T1 CPU 241 polls the framer's internal registers to extract the received A and B signaling states. T1 CPU 241 programs outbound A and B signaling states for framer 229.

Time/space switch 203 controls which DS0 channel is to fill a given time-slot on TDM bus 151. The switching capability of time/space switch 203 allows connection between any of the 24 time-slots from T1 framer 229 and the 256 time-slots on the TDM bus. Time/space switch 203 has a microprocessor interface via bus 203 which provides T1 CPU 241 with access to internal configuration registers and time-slot data. Time/space switch 203 has four CHI buses (TFL compatible) which can be controlled independently. Switch 203 also can be programmed for frame integrity for wide area network (WAN) compatibility. Frame integrity means that all the time-slots in the output frame came from the same input frame, even if the time-slots were on different CHI highways. This allows equal delay of all time-slots through the time/space switch. Thus, time-slots data can be contiguous.

Time/space switch 203 uses the TDM bus 74 clock signals to pass data between the TDM bus time-slots and T1 framer 229. The internal connection memory of time/space switch 203 is programmed by T1 CPU 241 with the proper connections. Time/space switch 203 allows T1 CPU 241 access to each of the 24 DS0 channels. T1 CPU 241 monitors the DS0 data being transmitted to modem module 76A or data being received from modem module 76A. T1 CPU 241 also can program time/space switch 203 to replace the DS0 data being transmitted to modem module 76A or framer 229 with any desired 8-bit pattern. Application module 175 uses this feature for in-band communications with modem module 76A. The programmability of DS0 channel data via time/space switch 203 allows application module 175 to connect the telephone company trunk with modem time-slot data or disconnect the two sides completely. T1 CPU 241 uses this feature to isolate the in-band signaling between modem module 76A and application module 175 from the telephone company.

Multiplex logic circuit 193 is controlled by T1 CPU 241 and is used to connect any one of the CHI highways from time/space switch 203 to TDM bus highways 156–157. TDM bus drivers 185 consist of 4 bi-directional TFL bus drivers. Configuration resistors 177 have been added to application module 175 to allow configuration of the transmit and receive highways 156–157. These resistors will allow application module 175 to talk to another application module without the use of a network management system.

Telephone interface module 105 provides the line interface circuitry between the T1 trunk 51 and T1 framer 229. Line interface unit 123 provides an interface for span line T1. Unit 123 contains automatic gain control (AGC), auto-equalization, and data/clock recovery circuitry and recovers the T1 1.544 MHz network clock which is used by application module 175 to clock data to T1 framer 229 and, depending on configuration, may be used by application module 175 as a timing source.

Connector 139 and drivers 143 form an RS-232 serial interface which is used for basic application module 175 management functions and software download via DUART 251. Interface module 105 is managed completely by application module 175. The network management module 86 can control the redundancy circuit 115.

B. Modem Modules 76 and 78 Detailed Description

Figure 6:
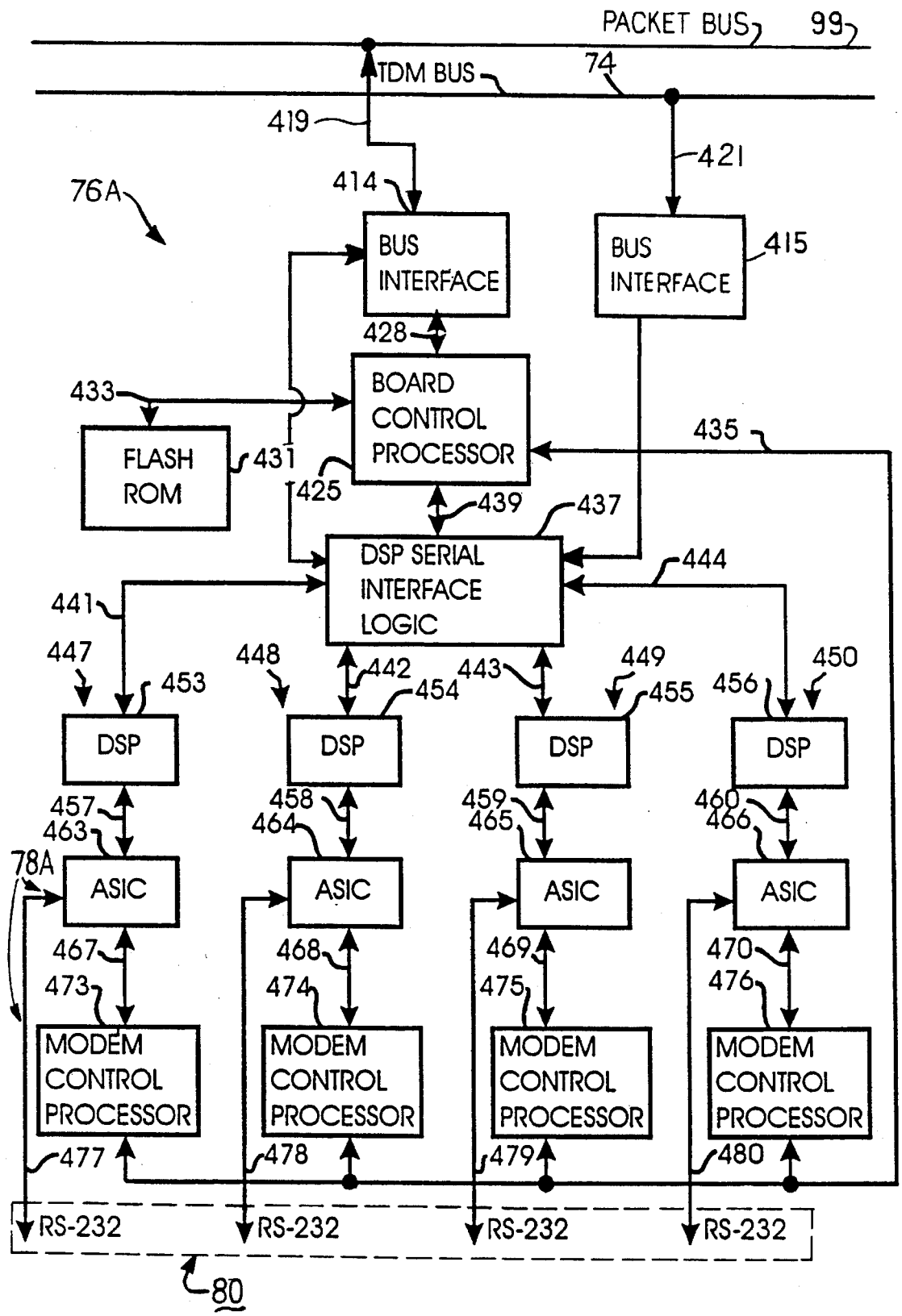
FIG. 6 is a detailed block diagram of a preferred form of a modem module of the type shown in FIG. 2.

FIG. 6 illustrates a representative quad modem module 76A which is identical to the other modem modules 76B–76F. Each of modem modules 76B–76F contains four modems for a total of 24 modems. As a result, network access server 30 can handle a total of 24 simultaneous full duplex channels of data communication. If two T1 span lines are inputted into telephone interface unit 72 (FIG. 2) then 12 modem modules may be provided to handle 48 simultaneous full duplex channels.

Modem module 76A comprises a bus interface unit 414 that communicates with packet bus 99 through output bus 419. A board control processor 425 communicates over buses 428, 433 and 435. A flash ROM 431 provides memory for processor 425. Flash ROM also contains the code for the modem control processors 473–476 as well as the digital signal processors 453–456. Bus interface 415 communicates with TDM bus 74 over bus 421.

Digital signal processor serial interface logic 437 communicates with processor 425 over a bus 439 and communicates with individual modems 447–450 over buses 441–444, respectively. Each of modems 447–450 is identical. The modems comprise digital signal processors 453–456, application specific integrated circuits (ASICs) 463–466 and modem control processors 473–476 connected as shown over buses 457–460 and 467–470. Processors 473–476 communicate with processor 425 over bus 435. ASICs 463–466 provide RS-232 ports 477–480. These ports, together with the comparable ports from modem modules 76B–76F form a group of modem network interface modules 78A–78F (FIG. 2) for coupling digital signals to the host computer system. The hardware for each of modems 447–450 is substantially the same as the hardware found in modem model USR Courier Dual Standard manufactured by U.S. Robotics, Inc., Skokie, Ill. Each modem will support the following modulation standards: V.32bis, V.32, V.22bis, V.22, Bell 212, Bell 103 and Bell 208B, and the following error correction and data compression protocols: V.42, V.42bis and MNP2–15.

Board control processor 425 performs the following functions: control of the reception and transmission of packets to and from a management bus (not shown), multiplexing tasks for the packet bus 99, controlling the code set for the entire modem module 76A, and distributing (i.e., downloading) code to the modems in the module 76A. Interface logic 437 performs the following functions: handles the interface to the TDM bus 74, counts the time slots, and multiplexes and demultiplexes signals in the TDM bus 74.

The circuits shown in FIGS. 3 and 6 are available commercially as indicated in the following table:

| Circuits | Manufacturer & Model Number |
| --- | --- |
| Line interface unit 123 | Level One LT 310 |
| Control logic 131 | Adv. Mic. Dev. PAL 22V10 |
| T1 framer 229 | AT&T T7230 |
| DSUART 251 | Signetics SCC 2692 |
| TDM bus drivers 185 | Tex. Inst. 74F126 |
| T1 CPU 241 | Intel 80C186 |
| Watch dog 253 | Maxim 697 |
| MUX logic 193 | Adv. Mic. Dev. 22V10 |
| Boot block flash ROM 255 | Intel 28F001 |
| Time/space switch 203 | AT&T T7270 |
| SRAM 257 | Hitachi HM 628128 |
| T1 PLL 215 | SE ULLA VXO |
| Clock MUX logic 219 | Adv. Mic. Dev. PAL 16V8 |
| Oscillator 225 | Pletronics 32 Mhz |
| LED logic and drivers 265 | Tex. Inst. 74 ALS573 |
| EEPROM 259 | Intel 28F64 |
| Bus interface 414 | Xilinx 3064 |
| Board control processor 425 | Intel 80C188EB |
| Flash ROM 431 | Intel 28F020 |
| DSP serial interface logic 437 | Xilinx 3042 |
| DSPs 453–456 | Tex. Inst. 32OC51 |
| ASICs 463–466 | US Rob. 1.016.684 |
| Modem control processors 473–476 | Intel 80C188EB |

The operation of modems 447–450 is coordinated by the clock and sync signals shown in FIG. 4. For example, referring to modem 447 (FIG. 6), on the trailing edge of the next bit clock following detection of the frame sync signal (FIG. 4), the assigned time slot number of modem 447 is loaded from a latch in the dsp serial interface logic 437 (FIG. 6) to a set of counters. A time slot counter counts the number of time slot clock pulses relative to the frame sync signal. When the counter reaches terminal count, the serial I/O (via tri-stateable buffers) of DSP 453 is switched to the TDM bus highway lines 156–157. One octet of data is then transmitted or received within that slot time (1.95 microseconds (us)). The bus is then released. Synchronization for data transfer is done via the TDM bit clock and a bit clock counter.

Processing of data by DSP 453 (filtering, demodulation, detection, etc.) is similar to that done when data transfer took place via an AIC. However, the 4.096 MHz bit rate must be accommodated. The synchronous serial port on the DSP can operate at one fourth the machine clock rate of 20.48 MHz or 5.12 MHz. Hence the 4.096 MHz data does not pose a problem.

C. Network Application Module and Network Interface Module Detailed Description

Figure 7A:
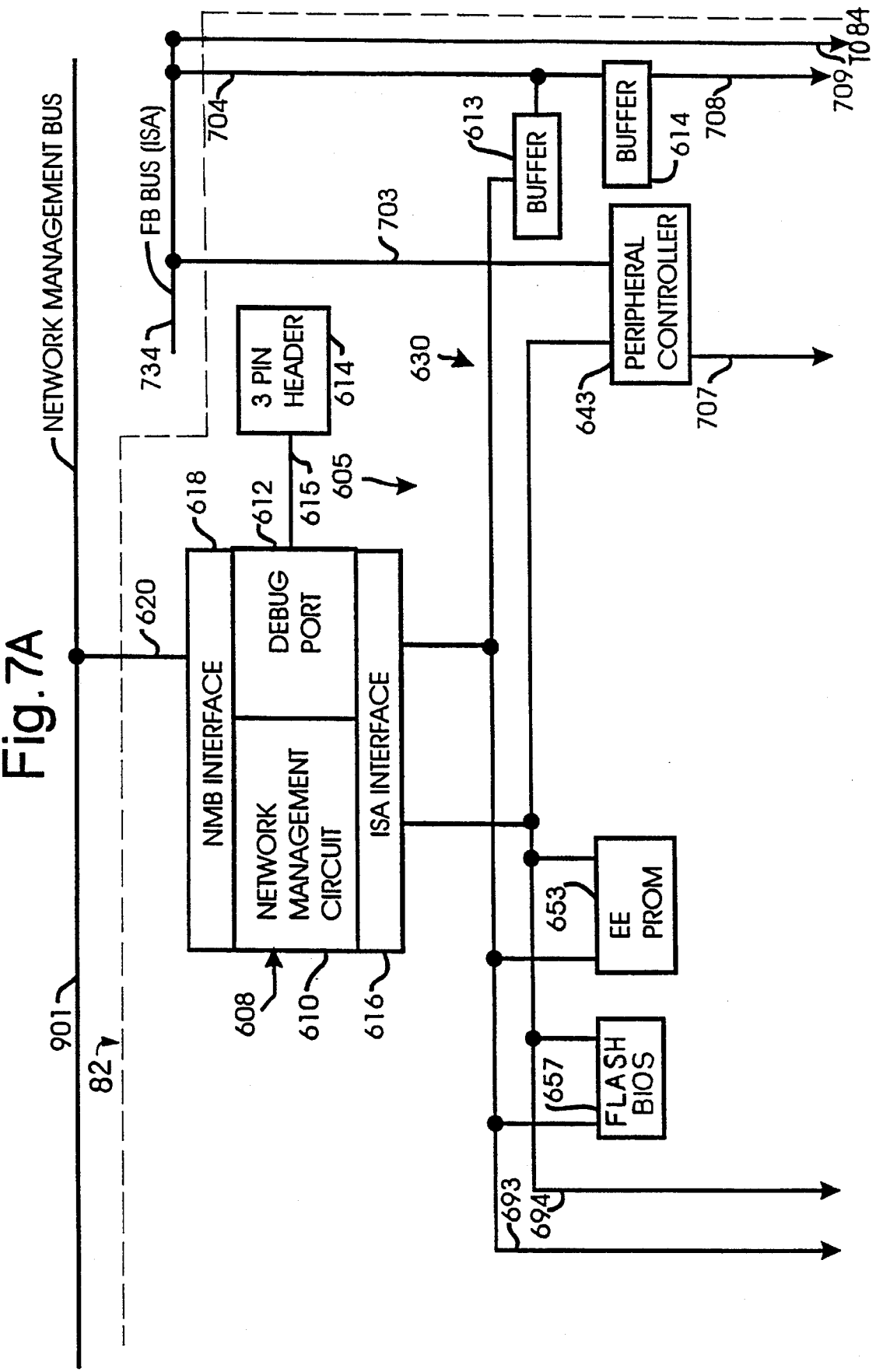
Figure 7C:
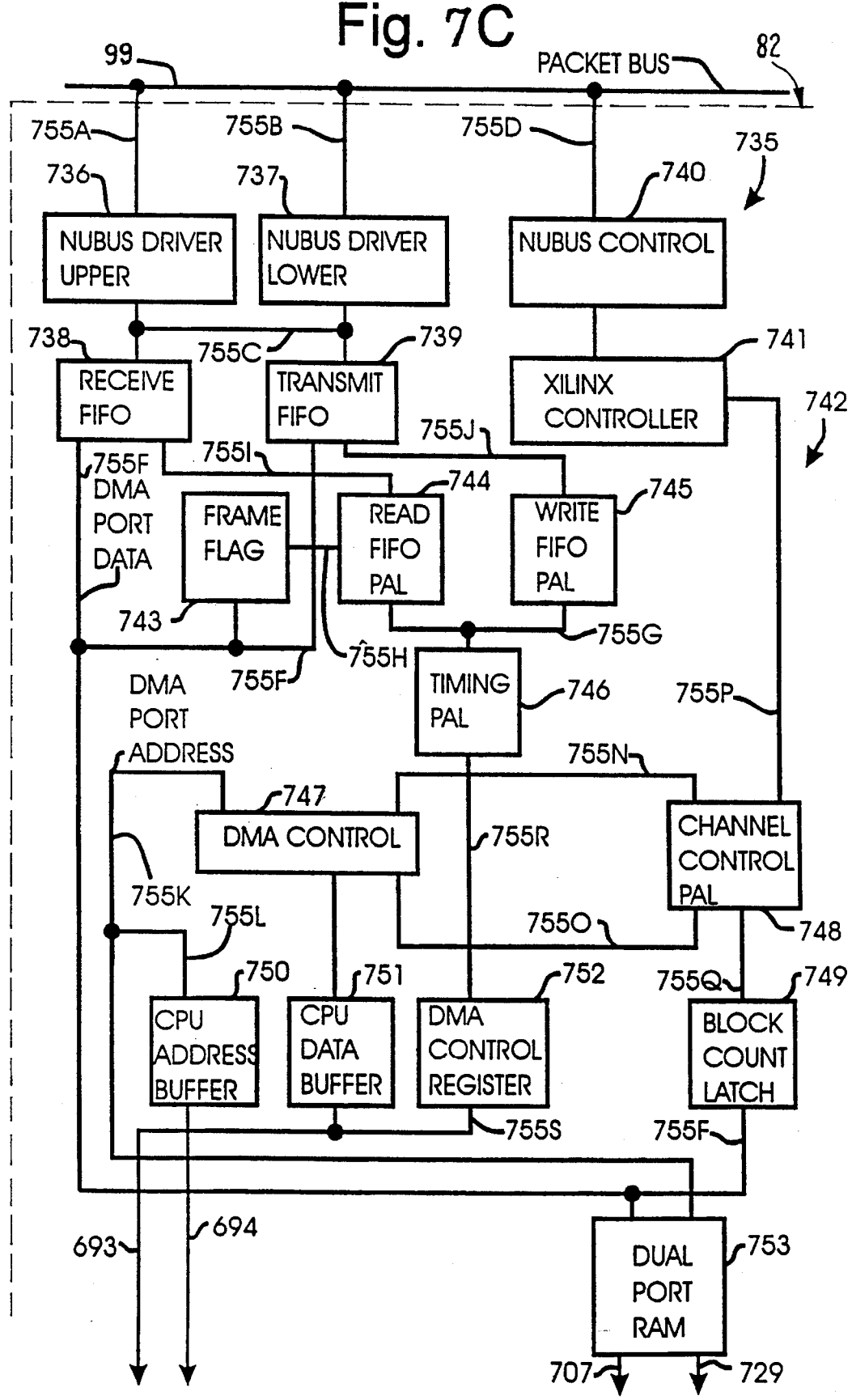

Referring to FIGS. 7A–7C, network application module 82 comprises a network management interface 608, control engine circuits 630, a packet bus control engine 735, and a direct memory access (DMA) engine 742.

Referring to FIG. 7A, interface 608 comprises a debug port 612, a 3 pin header 614 that is connected to port 612 by a bus 615, an ISA interface 616, a network management bus (NMB) interface 618, and a bus 620 that connects interface 618 with network management bus 901. Interface 616 is connected to data bus 693 and address bus 694 as shown. Interface 608 is a Signetics 2692 DUART. Half of the DUART is used as debug port 612.

Referring to FIGS. 7A and 7B, control engine circuits 630 include a central processing unit (CPU) 633, a memory controller 635 (Chips & Technology 82C351), a DRAM memory 637, a data buffer 641 (Chips & Technology 82C355), a peripheral controller 643 (Chips & Technology 82C356), a debug port 645, an EEPROM 653, a flash SIMM interface 655, a flash BIOS 657, an LED display 659, a three pin header 669, and a switch selector 677. The components are connected as shown by busses 693, 694, 703, 704, 707–709, 721 and 729, and by an ISA bus 734.

Referring to FIG. 7C, packet bus engine 735 comprises a NuBus driver 736 for upper address bits 0–15 and a NuBus driver 737 for lower address bits 16–31. A receive FIFO 16 bit register 738 and a transmit FIFO 16 bit register 739 enable the receipt and transmission of information on packet bus 99. Engine 735 also includes a NuBus control circuit 740 that is operated by a Xilinx controller 741.

Still referring to FIG. 7C, DMA engine 742 comprises a frame flag circuit 743, a read FIFO programmable array logic (PAL) 744, a write FIFO PAL 745, a timing PAL 746, a DMA control circuit 747, a channel control PAL 748, a block count latch 749, a CPU address buffer 750, a CPU data buffer 751, a DMA control register 752, and a dual port RAM 753.

The circuits in engines 735 and 742 are connected as shown by busses 755A–755S. Bus 755C is an 18 bit bus; bus 755F is a 17 bit bus; bus 755L is an 8 bit address bus; bus 755M is a 16 bit bus; bus 755S is an 8 bit bus; bus 694 is an 8 bit address bus; bus 693 is a 16 bit data bus; bus 755N is a 4 bit bus; bus 755O is a 4 bit bus; and bus 755Q is a 6 bit bus.

Figure 7D:
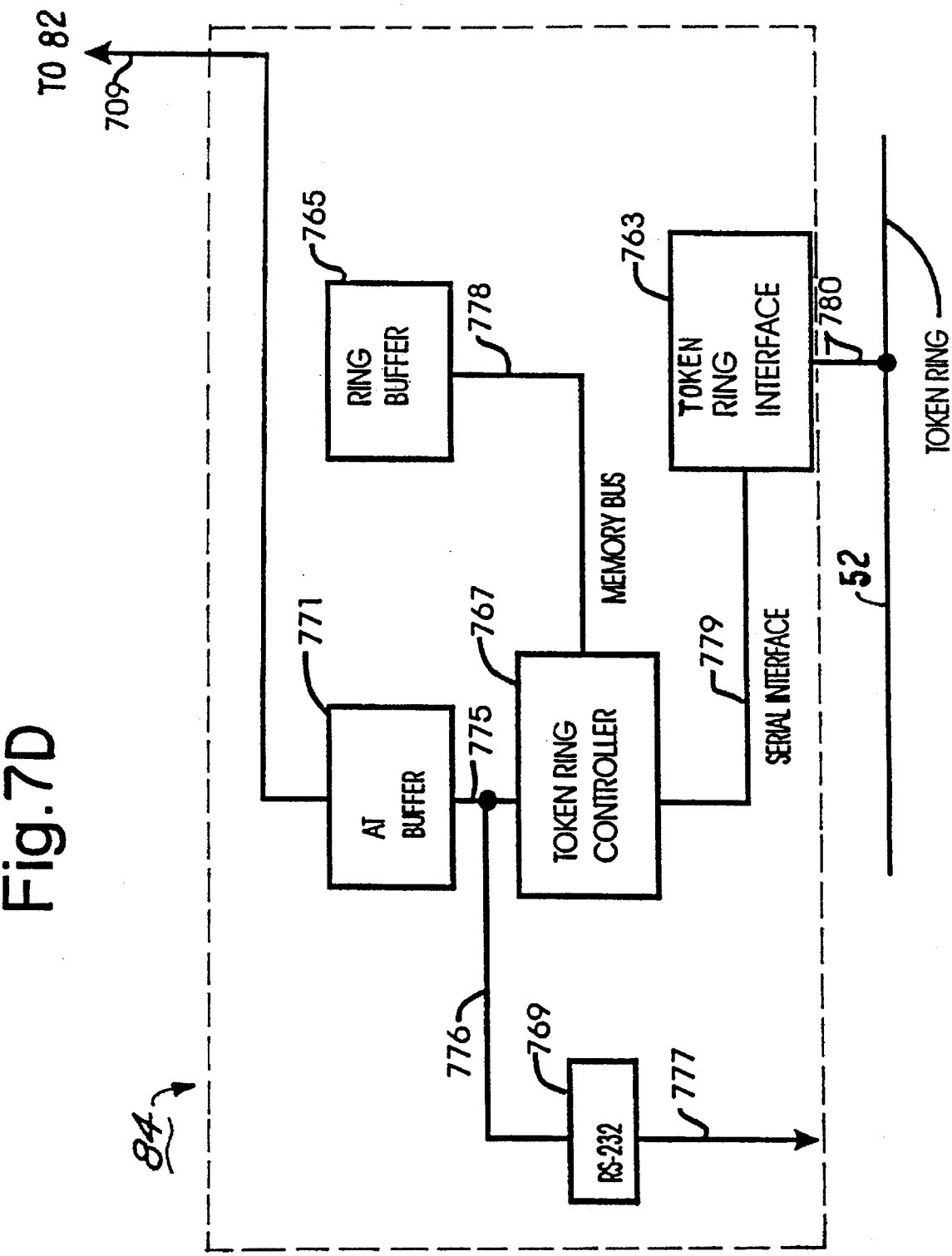
FIG. 7D is a schematic block diagram of a preferred form of a network interface module of the type shown in FIG. 2.

Referring to FIG. 7D, network interface module 84 comprises a ring interface 763, a ring buffer 765, a token ring controller 767, a RS-232 interface 769 and an AT buffer 771. The components are connected together as shown by busses 775 and 777–780.

CPU 633 (FIG. 7B) is an 80386DX running at 33 MHz. All CPU instructions are located in DRAM 637. The CPU footprint supports either the Intel 132-pin PQFP or the Advanced Micro Devices (AMD) version of the same processor.

Processor 633 has a watchdog function to detect possible hardware or software errors. The watchdog timer will initially power up disabled and can will software enabled. This is to allow BIOS 657 to initialize the system without interruption. After the watch dog timer is enabled, the time out period is 1.6 sec. for all applications. The software application is responsible for these enables. The timer will be responsible for (1) uniform reset state after power up; (2) NMI (non-maskable interrupt) when the first timer interrupt occurs; and (3) reset when the second consecutive timer interrupt occurs.

Memory controller 635 (FIG. 7B) provides the DRAM to CPU 633. Controller 635 controls all bus accesses including CPU 633, DRAM 637 and ISA bus 734. Timing parameters for DRAM 637 accesses and refresh are controlled by controller 635. The main chip in controller 635 is a 82C351 CPU/DRAM controller, a 160 pin PQFP. The following parameters are controlled from controller 635: reset and shutdown logic; bus 734 and CPU clock selection logic; control logic for CPU 633, DRAM 637, bus 734 access, bus arbitration, and 0 or 1 wait-state buffered write; memory control logic for DRAM access, refresh cycle, flash BIOS access and shadow RAM support; index registers for system control; fast reset; and fast gate A20.

DRAM 637 includes two SIMM banks of DRAM. Each bank can support the following DRAM modules: 256KX36 DRAM module–1 MB per bank; 1MegX36 DRAM module–4 MB per bank; and 4MegX36 DRAM module–16 MB per bank.

Data buffer 641 provides all the logic required to interface memory data bus 708 to local bus 729. The main chip in buffer 641 is an 83C355, a 120 pin PQFP. Buffer 641 buffers data between busses 708 and 729; generates and checks parity for DRAM 637; latches data for DRAM buffered writes; latches data from bus 734 during reads of CPU 633 from bus 734; performs data steering for accesses to bus 734; and provides paths for busses 704 and 693.

Peripheral controller 643 (FIG. 7A) controls all the peripheral devices on ISA bus 734. It contains the address buffers used to interface local address bus 707 to I/O channel address bus 694. The main chip in controller 643 is an 83C356, a 144-pin PQFP. It contains all the necessary peripheral control devices for basic ISA bus interconnection to ISA bus 734: DMA controllers (8237); interrupt controllers (8259); a timer/counter (8254); and an RTC (real time clock) with CMOS RAM+battery SRAM (MC14618).

Debug port 612 is a debug UART port. It is used to connect a debug terminal for software debugging. It is controlled by a 2692 DUART. This chip is interfaced to local bus 734 via data buffer 613 through bus 704.

Keyboard interface 651 (FIG. 7B) uses the Intel UPIC42 with a chip and technology keyboard algorithm mask on board. This part is a 44-pin PQFP. This part emulates the 8042 chips and technology keyboard interface and is interfaced via data buffer 613 through bus 704.

Electrically erasable PROM 653 (FIG. 7A) is an 8KX8 EEPROM which stores board information, such as serial number and all configuration data to run and initialize application programs. This device has the ability to be software write-protected. Once enabled, the device can be automatically protected during power-up and power-down without the need for external circuitry. The 8KX8 EEPROM is interfaced via data buffer 613 through bus 704. Accesses to this device are through a paging interface whereby 2K pages are accessed via a pre-loaded page register. The chip is a 32-pin PLCC.

Flash SIMM Interface 655 (FIG. 7B) supports up to 8 1MegX8 symmetrically blocked flash memories. The flash SIMM interfaces to processor 633 via local bus 729. All operating system and application code are stored in the flash SIMM.

BIOS ROM 657 (FIG. 7A) stores a ROM-based code common to all IBM PCs and is executed at power-up or reset just after RAM refresh is started and a program stack is created. BIOS provides power-on diagnostics and low-level driver support and executes the operating system at the end of the power-on sequence. The BIOS resides in a flash ROM and is executed out of the 64 Kbyte area located at the top of the 4 Gbyte address space. After the PC engine has been fully initialized and tested, the extended BIOS initializes all specific devices on card 605 and loads operational software from the flash SIMM to DRAM 637. Once all initialization and testing is complete, BIOS can be shadowed down to a 128 Kbyte address area located in the first Mbyte of memory.

LED display 659 (FIG. 7B) contains the LEDs on card 82. All LEDs can be controlled by software via a 16-bit register. All LEDs are interfaced from ISA bus 734 via data buffer 613 through bus 693.

Referring to FIG. 7C, NuBus upper and lower buffers 736 and 737 are responsible for buffering both the 32 bit NuBus address and data busses 755A and 755B to and from packet bus engine 735.

NuBus control 740 is responsible for handling all the interface control signals to and from packet bus 99. Control 740 is monitored and controlled by the state machines of Xilinx controller 741.

Receive FIFO 738 represents 512×18 bits of FIFO memory used to buffer data from NuBus data buffers 736 and 737 to dual port RAM 753. FIFO 738 is controlled by Read FIFO PAL 744 and can be accessed through program control using a maintenance buffer (not shown). FIFO 738 also can be reset via program control.

Transmit FIFO 739 represents 512×18 bits of FIFO memory used to buffer data from the dual port RAM 753 to NuBus data buffers 736 and 739. FIFO 739 is controlled by write FIFO PAL 745 and can be accessed through program control using a maintenance buffer (not shown). FIFO 739 also can be reset via program control.

Xilinx controller 741 represents a Xilinx FPGA used to control, through state machines, the movement of data to and from FIFO 738 and 739, and to and from NuBus buffers 736 and 737. Controller 741 has internal control and status registers, and can be programmed from the CPU interface.

DMA controller 747 represents the 20 Mhz 82C257 DMA controller. It is responsible for creating the address and handshake signals needed to move data to and from the dual port RAM 753 and to and from FIFOs 738 and 739. Control 747 contains internal control registers and status registers.

Read FIFO PAL 744 generates, through the use of timing queues from timing PAL 746, DMA control 747 and Xilinx controller 741, the necessary signals to unload the read data from receive FIFO 738 and present the data on bus 755F to dual port RAM 753.

Write FIFO PAL 745 generates, through the use of timing queues from timing PAL 746, DMA controller 747 and Xilinx controller 741, the necessary signals to load the write data from dual port RAM 753 to transmit FIFO 739.

Timing PAL 746, through status and start queues generated from program control and the FIFO full and empty lines, generates seven timing cycles which are divided across the DMA cycle to control the movement of data and the correct execution of control signals.

Channel control PAL 748, through the use of control information from program control and from block count latch 749, routes request and end of DMA information to their appropriate places.

Frame flag 743 is a bit register, loaded into the FIFO by the Xilinx controller 741 at the end of a block, that is used to queue the hardware when the block count information for the next transfer is present, at which time the logic will read that information out, and write it to the block count latch. Flag 743 can be written to via program control.

Block count latch 749 represents a latch which stores the block count information for the next block transfer. Latch 749 is loaded from read FIFO PAL 744.

CPU address buffer 750 represents the buffers used by CPU peripheral bus 694 to access the DMA controllers address bus 755K to load or read control information.

CPU data buffer 751 represents the bi-directional buffers used by CPU peripheral bus 693 to access the DMA controllers data bus 755M for loading and unloading of control and status information.

DMA control register 752 represents the control register used to queue start up processes for the DMA logic. The DMA can be turned off and turned on via processor control through register 752 both on the transmit side and/or the receive side.

Dual port RAM 753 stores data for packets and blocks and channel control programs for the DMA. RAM 753 is accessed from port 1 by the CPU, and from port 2 by the DMA control logic. RAM 753 is made up of 256k bytes of static RAM under the control of a dual port arbiter.

Referring to FIG. 7D, ring interface 763 contains the digital interface to the digital portion of the token ring control and buffer logic and the analog interface to the token ring medium to make a full duplex electric interface as per IEEE Std 802.5-1989. Interface 763 consists of a TMS38054 ring interface device and associated analog circuitry to handle clock and data recovery at both 4 and 16 Mbps, using either shielded or unshielded twisted pair connection. The chip is a 44-pin PCCP.

Ring buffer 765 carries four 256KX4-100 DRAMS used to hold the ring data. This DRAM array is used to buffer the token ring frame when it comes in from the token ring network TRN1. It also holds all the MAC and LLC software that runs the TMS380 controller in controller 767. The DRAM in buffer 765 is controlled by controller 767. The software and data contained in the DRAM is executed by controller 767.

Token ring controller 767 is made up of the TMS38C16 token ring commprocessor. It is a complete IBM token ring, IEEE 802.5-1989 compatible chip capable of running at both 4 and 16 Mbps data rates. It also handles all the data transfers to and from dual port RAM 753 (FIG. 7C). The chip is a 132-pin PQFP.

RS-232 interface 769 provides an interface to the outside world to communicate with the application software running on card 605. The interface connection is via a RJ45 female port. It is made using a 16C550 UART. This chip interfaces to ISA bus 734 via bus 709. The baud rate of the interface is selected via selector switch 677 (FIG. 7B).

III. The Call Connection and Modem Configuration Process

The process by which the network access server 30 processes incoming calls and outgoing calls will be described in connection with the following terms:

Span line T1 refers to twenty-four 64 kilo bits per second DS0 channels on line T1 that are multiplexed into the 1,544 mega bytes per second DS1 rate, with each DS0 channel carrying the digital telephone signal representation of an analog voice channel.

A trunk is a communications channel between two switching systems. In the context of this specification, the term "trunk" will refer to a single DS0 channel. A trunk group will refer to multiple DS0 channels.

A seizure is an off-hook signal transmitted by the PSTN on a previously idle trunk. Detection by the incoming call application module 175 of a seizure will indicate an incoming call.

There are two types of wink signals: off-hook winks and on-hook winks. This specification will refer to an off-hook wink type only. An off-hook wink signal is the transition to the off-hook state from an on-hook state, then back to an on-hook state after a short period of time. Application module 175 (FIG. 3) uses the wink signal as a response to a trunk seizure.

MF tones are made up of six frequencies that provide 15 two-frequency combinations for indicating digits 0–9 and KP/ST signals. In the feature group B (FGB) service, these tones will represent the dialed number. Feature group D (FGD) service supports both called (DNIS) and calling (ANI) information.

An answer is an off-hook signal from the called equipment and indicates that the call has been properly answered. This is the time at which telephone company billing begins. Application module 175 is responsible for transmission of this signal when answering an incoming call and monitoring this signal when dialing an outgoing call.

A disconnect is an on-hook signal applied to the called trunk or from the called trunk which ends the call connection.

In-band signalling is signalling that uses the same path or DS0 channel as a customer's PCM data. The term "in-band signalling" is generic and can take the form of PCM encoded MF tones, rob bit signalling or call connection patterns. E and M signalling is a traditional type of call signalling for an analog voice service from the telephone company's equipment. E and M type II signalling includes wink start and answer supervision. E and M is an acronym for ear and mouth, and in an analog service are the wires which provide the signalling path between the customer and the telephone company. The E and M wires are usually referred to as leads. In a typical plain-old-telephone service (POTS) application, the telephone company uses the E-lead to transmit signals towards the customer's equipment and uses the M-lead to receive signals from the customer's equipment. The E and M leads each provide two signalling states, onhook and offhook. When the analog phone line between the customer's equipment and the telephone company's equipment is idle, the E and M leads are in the on-hook state. The telephone company initiates a call towards the customer's equipment with a trunk seizure, an E-lead off-hook signal. A trunk seizure will persist until the end of the call. The customer's equipment will acknowledge the trunk seizure with an M-lead off-hook signal which is detected by the telephone company's equipment. This traditional method of signalling is one way the telephone company's equipment provides call signalling to the customer's equipment.

T1 equipment (i.e., DS-1 level service) does not use separate signalling leads to handle call signalling, but instead uses in-band signalling. The telephone company in-band signalling is accomplished by use of A and B signalling bits. The A and B signalling bits occur at the sixth and twelfth frames of every T1 superframe (SF) and occupy the least significant bit (LSB) position of all 24 DS0 channels during each of these frames. The telephone company's in-band signalling will overwrite or replace the LSB of the DS0 channel data. This method of in-band signalling is referred to as robbed bit signalling. The A and B signalling bits indicate what signalling state each T1 DS0 channel is in. The signalling bits translate directly to the E and M leads described above. Table 1 illustrates the relationship between the E & M and A & B signalling states.

TABLE 1

E&M Lead Signalling States vs. A&B Bit Signalling States.

| E&M Input/Output | Transmitted | | Received | |
|---|---|---|---|---|
| | A | B | A | B |
| M-Lead (on-hook) | 0 | 0 | 0 | * |
| M-Lead (off-hook) | 1 | 1 | 1 | * |
| E-Lead (on-hook) | 0 | 0 | 0 | * |
| E-Lead (off-hook) | 1 | 1 | 1 | * |

0 value indicates ON-HOOK state of signalling bit.
1 value indicates OFF-HOOK state of signalling bit.
*indicates don't care.

Application module 175 can monitor and detect changes in signalling states of the A and B bits by use of T1 framer 229 which gives the application module 175 the ability to detect incoming calls from the telephone company's switching equipment. The T1 framer 229 also provides the application module 175 with the capability to transmit A and B signalling bit information for all 24 DS0 channels to the telephone company which allows the application module 175 to respond to trunk seizures, answer calls and initiate disconnects.

Multifrequency (MF) tone in-band signalling is used to transmit numerical information and control signals from the telephone company's equipment to the customer's equipment. Quad modem modules 76A–76F detect and decode the MF tones during call set-up. The following paragraphs explain the MF tones, their sequences, and how they are used by the modem modules 76A–F. It will be appreciated that Dual Tone Multifrequency Tone (DTMF) in-band signaling may also be decoded and used.

As shown in Table 1, MF signalling is made up of six frequencies which are paired up to make 15 MF tone combinations, which are correlated to a specific digital data or control digit (referred to herein as a Dialed Number Information System (DNIS) digit).

TABLE 2

| Frequencies in HZ | Control Digit (DNIS) |
|---|---|
| 700 + 900 | 1 |
| 700 + 1100 | 2 |
| 700 + 1300 | 4 |
| 700 + 1500 | 7 |
| 700 + 1700 | ST''' or ringback |
| 900 + 1100 | 3 |
| 900 + 1300 | 5 |
| 900 + 1500 | 8 |
| 900 + 1700 | ST' |
| 1100 + 1300 | 6 |
| 1100 + 1500 | 9 |
| 1100 + 1700 | KP |
| 1300 + 1500 | 0 |
| 1300 + 1700 | ST'' |
| 1500 + 1700 | ST |

The MF tones indicate digits 0 through 9 and the special KP/ST tones indicate the beginning and end of an MF tone sequence. The MF sequence received from the telephone company in the case of a feature group B service is –KP+ 950+XXXX+ST. The 950-XXXX portion of the sequence represents the carrier access code (CAC) which is the number dialed by the originating caller. The MF tones are transmitted by the telephone company 70 milliseconds (ms) after the application module 175 responds to the trunk seizure. The duration of each MF tone in the KP+950+ XXXX+ST sequence is as follows: (1) the KP signal length will be 90 to 120 ms; (2) the ST and digit signals will be 58 to 75 ms; and (3) the interval between all MF signals will be 58 to 75 ms. The entire MF sequences will have maximum duration of 1.32 seconds.

The MF tones may, for example, represent the dialed 950 number from the originating caller. The 950 numbers can be used to indicate to modem module 76A what type of modulation scheme (or other configuration parameters) to use for that call. For example, numbers may be assigned the following modulation schemes:

950–1754 can be assigned to 300, 1200 and 2400 baud V.22 BIS asynchronous modulation used for credit card verification with limited training by modems 403–408;

(2) 950–1772 can be assigned to 300 to 14.4K baud using various asynchronous modulation schemes for any speed interactive asynchronous communications with normal training by modems 403–408; and (3) 950–1755 can be assigned to Bell 208B 4800 baud half-duplex synchronous modulation.

Assigning 950 numbers to certain modulation schemes reduces the time quad modem modules 76A–76F will spend training on the modulation scheme being sent from the calling modem, thus reducing the overall call connection time. Modem module 76A has the ability to execute a pre-configured AT command string based on the CAC.

The following section describes the process and signalling details of an incoming call, from call set-up and call connection, to call disconnect. This section will start with the processing sequence of an incoming call from the telephone company by the network application module 175 for a typical scenario of a Feature Group B service with E and M signalling, wink start and answer supervision. A description of how the in-band signalling sequences between application module 175 and the quad modem modules 76A–76F are accomplished, and how the connections between the telephone company and the modems are completed is summarized in FIG. 8.

Network access server 30 is capable of enabling full duplex data communication between the call originators and the terminals of the host computer system simultaneously (FIG. 1). The communication between any pair of computers and terminals is handled in the same manner. As a result, an explanation of the communication between call originator 20 and terminal C5 also explains simultaneous communication between other pairs of call originators and terminals of the host system.

Assume call originator 20 initiates a call to computer C5. Network access server 30 has the capability of routing calls placed to a particular telephone number to an assigned one of computers C3–C5. According to one aspect of the invention, the particular routing decision for the incoming calls can be based upon the ANI/DNIS information extracted from the control signals. Computer C1 of call originator 20 provides call set-up information, including the telephone number assigned to computer C5, and transmits digital data signals representing digital data to modem M1. Assume that computer C5 is available on number 950-XXXX. Modem M1 converts the set-up information and digital data to analog telephone signals on line 40. The telephone company network 50 converts the signals to digital T1 telephone signals and placed the call on a DS0 on the T1 span line 51 connected to the network access server 30. The telephone company network 50 then initiates a call to telephone interface application module 175 via span line 51. Assume that the T1 channel receiving the call is assigned to modem 447 (FIG. 6).

Figure 8:
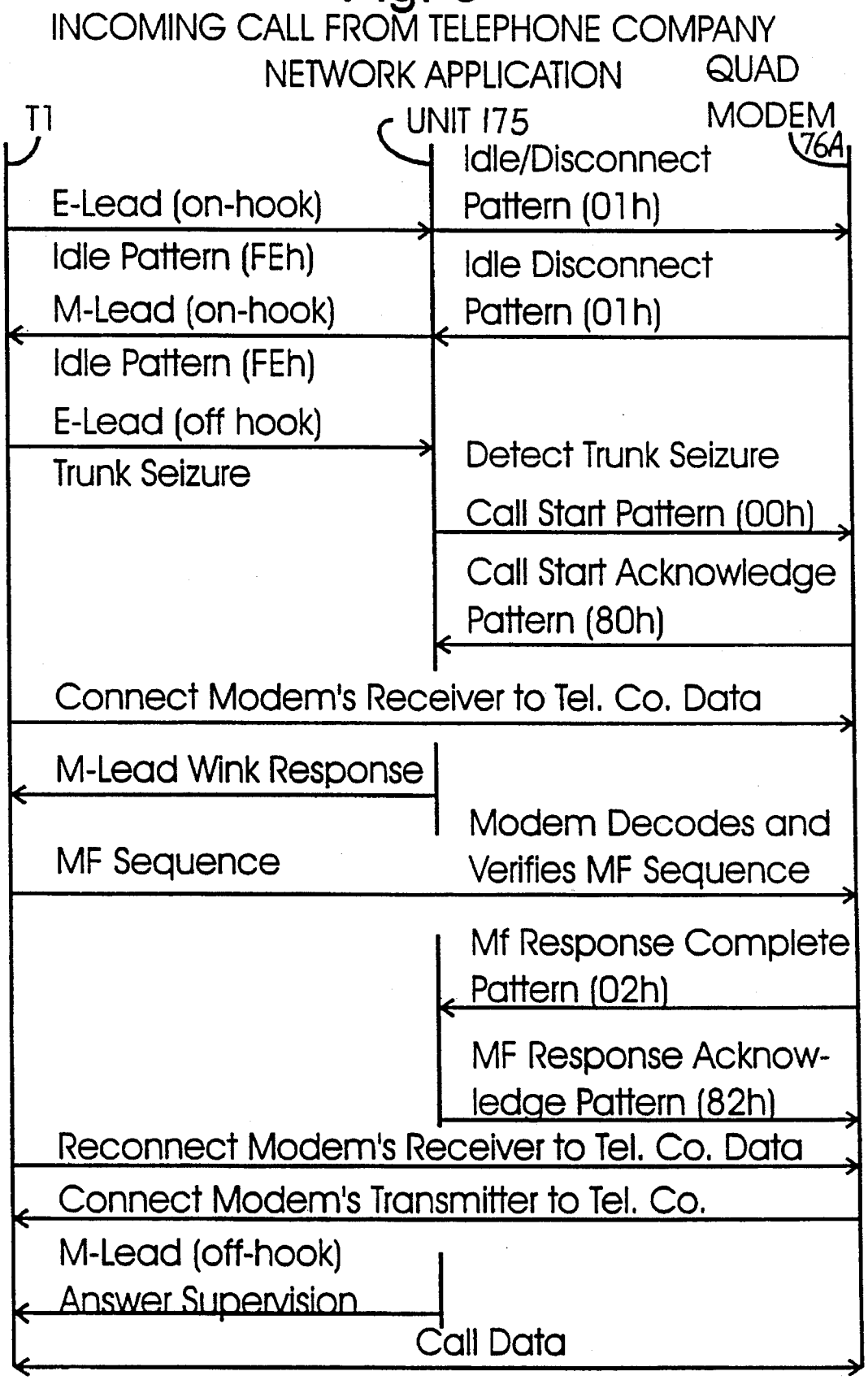
FIG. 8 is diagram illustrating the sequence of events that occur during the call connect process when the control signals are in the form of multifrequency tones.

FIG. 8 shows call set-up signals to the application module 175 and data signals being transmitted between line T1 and a quad modem module. The remaining signals shown in FIG. 8 are signals used in supervision of the modem module.

The trunk is considered to be in the idle state when not in a call connection. During the idle state, the telephone company is transmitting E-lead on-hook (via A and B signalling bits) and the application module 175 is transmitting M-lead on-hook. The modem assigned to that trunk (modem 447) is not connected to the telephone company at this time. T1 CPU 241 has programmed time/space switch 203 to transmit the idle/disconnect pattern (01h) to modem 447 via TDM bus 151 and idle pattern (FEh) to the telephone company via bus 230, T1 framer 229 and line interface unit 123. Modem 447 is in the idle condition transmitting the idle/disconnect pattern to T1 NAC 175 and waiting to receive the call start pattern (00h) from T1 NAC 175. T1 CPU 241 monitors (via unit 123, framer 229 and bus 230) for the E-lead off-hook signal from the telephone company which initiates a call set-up sequence.

Switch 203, bus 230 and TDM bus 74 (FIG. 3) offer a unique advantage for processing incoming and outgoing calls. T1 CPU 241 can control the transmission of call control signals to and from modem 447 via bus 230, switch 203 and TDM bus 151 during one time period. During another time period, T1 CPU 241 can communicate with line T1 via bus 230, T1 framer 229 and line interface unit 123. At other times, T1 CPU 241 can control the transmission of data between modem 447 and line T1 via TDM bus 74, switch 203, bus 203, framer 229, and line interface unit 123. The arrangement of components shown in FIG. 3 provides a fast and economical technique for processing both incoming and outgoing calls.

Figure 9:
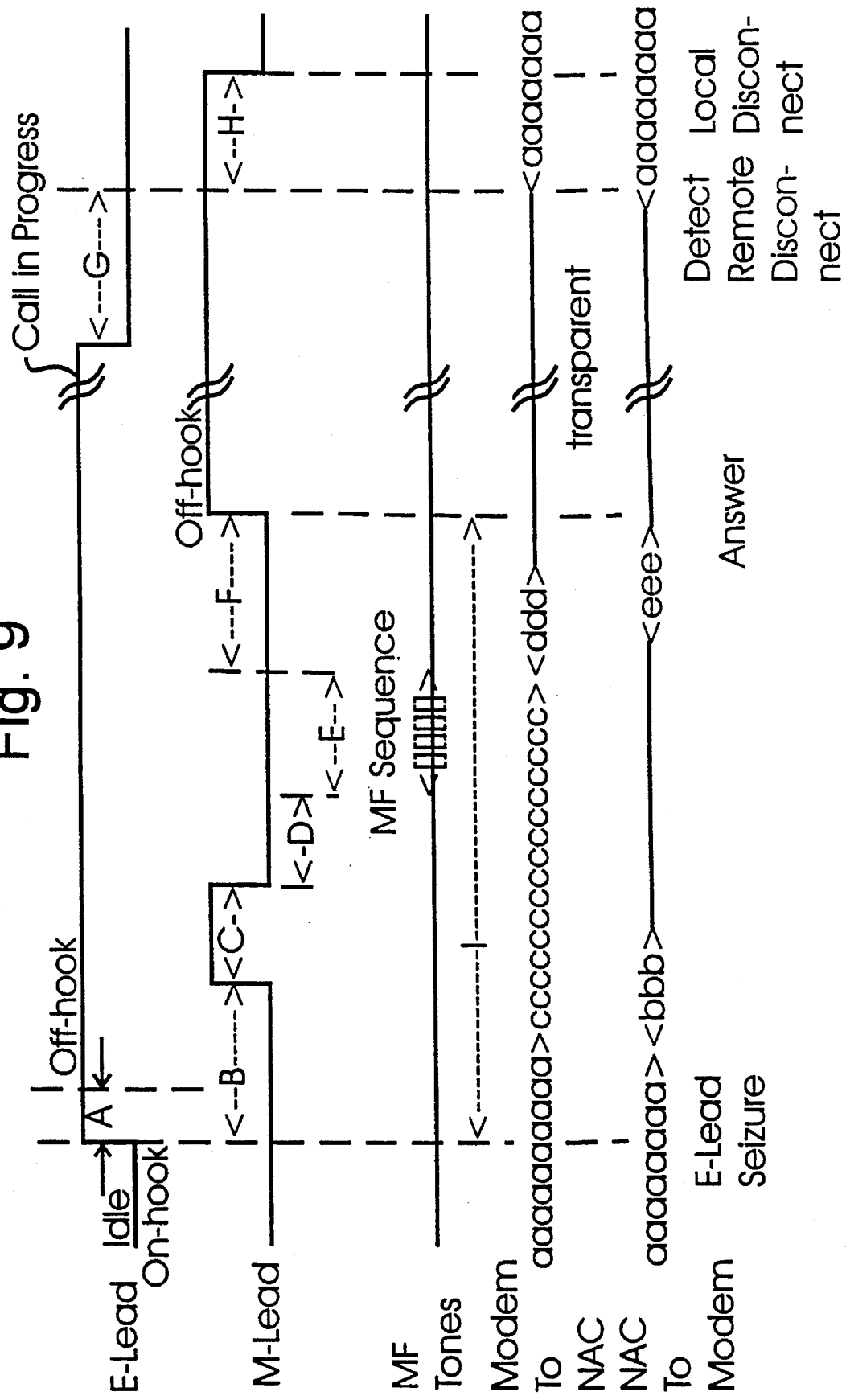
FIG. 9 is a detailed timing diagram of the call connect diagram of FIG. 6.

The call set-up sequence begins with a trunk seizure. The trunk seizure is done by the telephone company equipment transmitting an E-lead off-hook signal (FIG. 8). The seizure is shown in FIG. 9 on the E-lead line. Using T1 framer 229 to detect the off-hook state of the E-lead, application module 175 debounces and verifies the trunk seizure within 40 ms from the time it was received by T1 CPU 241.

Once T1 CPU 241 has determined that the E-lead seizure is valid, it uses an in-band signalling pattern to notify modem 447 via bus 230, switch 203 and TDM bus 74. T1 CPU 241 programs the call start pattern (00h) into time/space switch 203 which begins transmitting this pattern to modem 447 via TDM bus 74 during every frame of the TDM bus time-slot. At this time, modem 447 is not connected to the telephone company trunk and is not receiving telephone company data or transmitting data to the telephone company. T1 CPU 241 expects a call start acknowledge pattern (80h) from modem 447 and uses time/space switch 203 to detect this pattern via TDM bus 74 and bus 230. T1 CPU 241 requires approximately 16 ms to detect and verify any pattern from a modem received via TDM bus 151, switch 203 and bus 230.

When T1 CPU 241 has detected and verified the call start acknowledge pattern (80h) from modem 447, it programs time/space switch 203 to connect the modem's receive data to the incoming telephone company trunk via TDM bus 74, bus 230, T1 framer 229 and line interface unit 123. The modem's transmit data is not connected to the telephone company trunk at this time. The modem's receive data connection is made in preparation for the receipt of the MF tone sequence from the telephone company. Before the wink is sent to the telephone company, 210 ms must elapse from the time of the E-lead seizure (time period B, FIG. 9). T1 CPU 241 then sends the M-lead wink response pulse, which is a transition to the off-hook state for 200 ms, then back to on-hook (time period C, FIG. 9).

If no acknowledge pattern is received from modem 447 after 4 seconds, T1 CPU 241 records the event and will not respond to the telephone company. If a time-out occurs, T1 CPU 241 programs time/space switch 203 to transmit idle/disconnect pattern (01h) to modem 447. At this time, no connection between the telephone company and modem 447 exists and modem 447 should return to the idle condition during which modem 447 transmits the idle/disconnect pattern (01h) to application module 175.

The telephone company begins transmitting the MF sequence 70 ms after it detects the M-lead wink (time period E, FIG. 9). Modem 447 receives the KP+950+XXXX+ST MF sequence (via unit 123, framer 229, bus 230, switch 203 and TDM bus 74) during a time period of approximately 1.32 seconds. Immediately after modem 447 detects the ST tone, it verifies the entire MF sequence and then transmits the MF complete pattern (02h) to application module 175. At this point, the modem 447 decodes the MF tones and the network access server 30 simultaneously configures the modem 447, as explained in detail below.

T1 CPU 241 detects the MF complete pattern (via TDM bus 74, switch 203 and bus 230) in approximately 16 ms and programs time/space switch 203 to send the MF complete acknowledge pattern (82h) to modem 447 via TDM bus 74. T1 CPU 241 transmits the 82h pattern for 20 ms and then completes the connection of modem 447 to the telephone company by programming time/space switch 203 to connect TDM bus 74 to bus 230, framer 229 and line interface unit 123. The connection between the modem and the telephone company is now complete and the assigned modem in module 76A begins to look for incoming carrier from the calling modem M1 of call originator 20 (FIG. 1). Full duplex communication between modems M1 and modem 447 of module 76A is enabled.

Modem 447 demodulates the digital telephone signals received over TDM bus 74 to form corresponding digital network signals without creating analog telephone signals. The digital network signals are transmitted through RS-232 coupling port 80 (FIG. 6), and sent to, for example, computer C4 (FIG. 1) for display or processing.

If for any reason modem 447 cannot verify the MF sequence, it will not respond to the application module 175 with the MF complete pattern (02h). After 4 seconds, T1 CPU 241 times out and programs time/space switch 203 to transmit idle/disconnect pattern (01h) to modem 447. T1 CPU 241 does not respond to the telephone company in this case and maintains the M-lead on-hook state and logs the event. The telephone company network time-outs when it does not receive the answer signal on the M-lead (FIG. 9) from application module 175 and also logs the event. The telephone company returns the trunk to the idle state and is ready to assign another call.

After the connection of the telephone company to modem 447 is complete, application module 175 must respond with an answer signal (M-lead off-hook) (FIG. 8). This will indicate to the telephone company that the call connection should be completed. However, there must be a 100 ms delay from the time the ST tone is received by the modem to the time the answer signal is transmitted to the telephone company. Once the signal delay condition is satisfied, T1 CPU 241 programs T1 framer 229 to transmit the M-lead off-hook answer signal to the telephone company. The M-lead off-hook answer signal persists for the duration of the call connection. At this point, the call connection is complete and the calling modem M1 and modem 447 begin communicating.

From the information given in FIG. 9, assuming a 1 DNIS address digit is received, a time period of 0.910 seconds normally is required from the time of trunk seizure to the time modem 447 actually is connected to the telephone company. The maximum time for such a connection is 2.37 seconds.

A timing diagram of the dial-in call processing shown in FIG. 8 is provided in FIG. 9. The E-lead, M-lead and MF tones signals shown in FIG. 9 appear in digital form on line T1. The letters used in FIG. 9 have the following meanings and time durations:

| Symbol | Description | Min | Typ | Max | Units |
|---|---|---|---|---|---|
| A | E-lead seizure debounce | 40 | 45 | 50 | ms |
| B | Seizure to wink delay | 210 | 220 | 230 | ms |
| C | Off-hook wink duration | 140 | 200 | 210 | ms |
| D | Wink to multifrequency (MF) delay | 70 | 100 | — | ms |
| E | Multifrequency (MF) sequence duration | 0.26 | .47 | 1.4 | sec |
| F | ST tone to call answer supervision delay | 100 | 110 | 120 | ms |
| G | E-lead on-hook call disconnect delay | 300 | 315 | 320 | ms |
| H | E-lead on-hook to M-lead on-hook delay | — | 20 | 50 | ms |
| I | Trunk seizure to answer supervision | 0.78 | 1.1 | 4.0 | sec |

| Symbol | Pattern |
|---|---|
| a | Idle/disconnect pattern (01h) |
| b | Call start pattern (00h) |
| c | Call start acknowledge pattern (80h) |
| d | MF complete pattern (02h) |
| e | MF complete acknowledge pattern (82h) |

IV. Correlation and Usage of Control Signals

Figure 10:
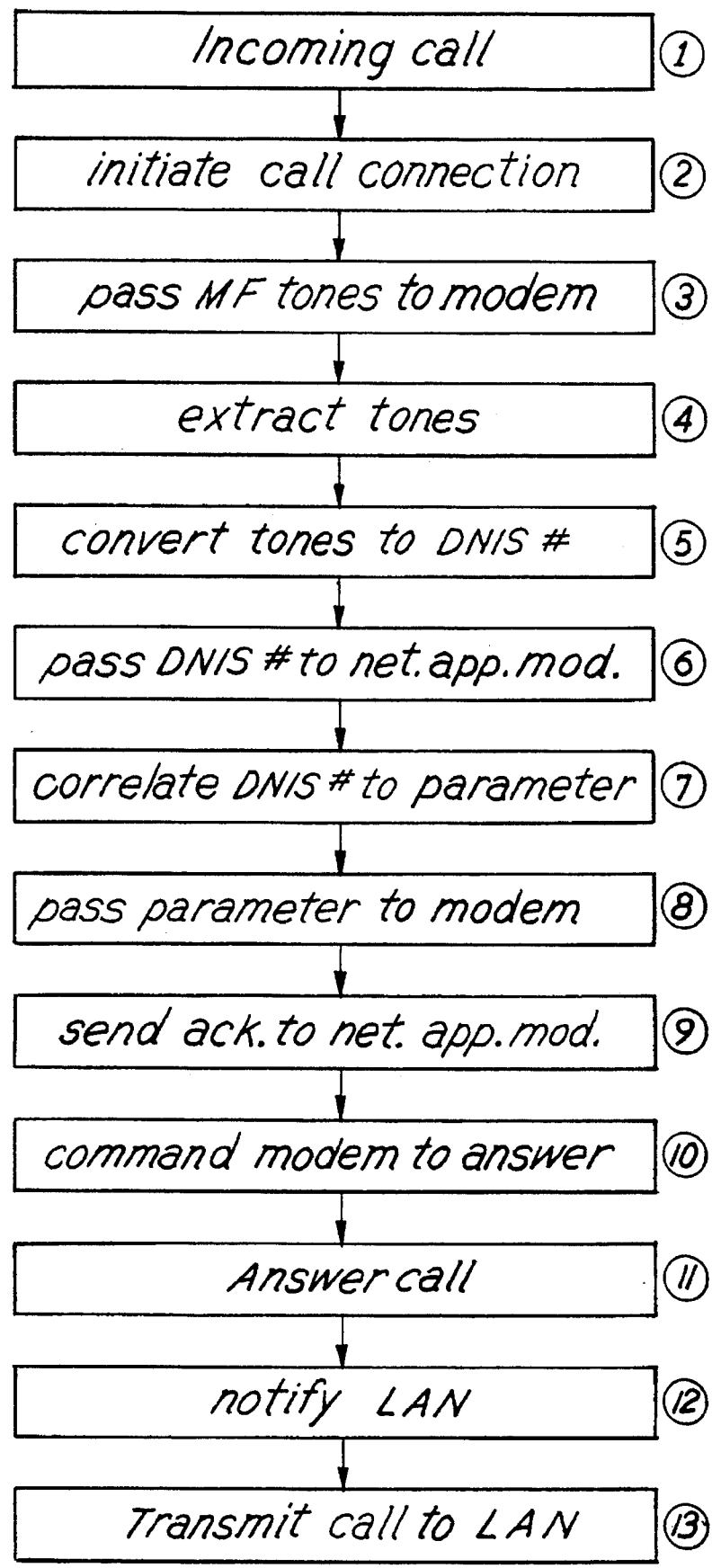
FIG. 10 is a flow diagram illustrating the steps that occur during the call connect process to configure the network access server according to the protocol used by the call originator.
Figure 11:
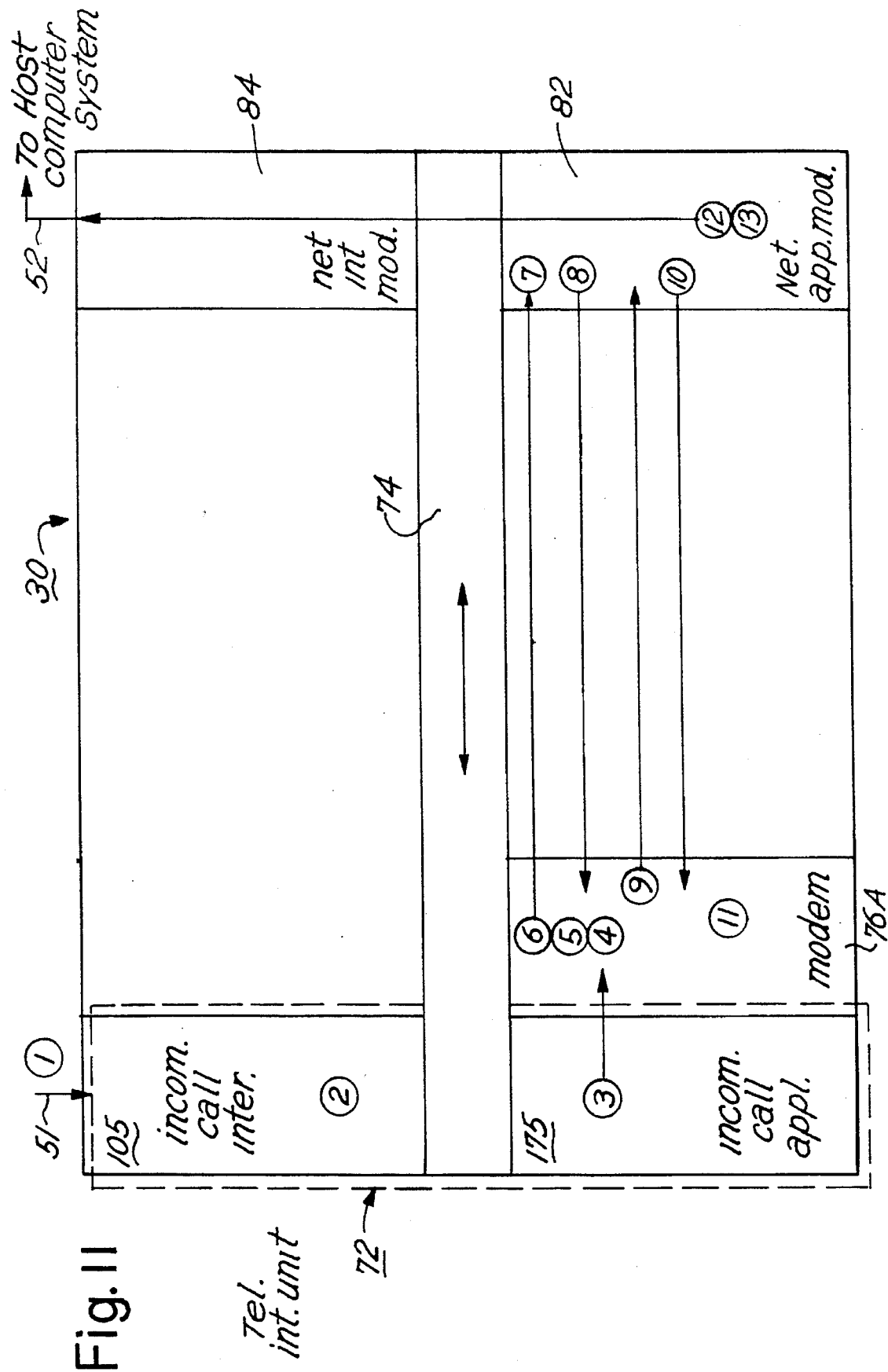
FIG. 11 is a block diagram of the network access server showing the flow of data within the network access server as the steps of FIG. 8 are carried out.

A. Conversion to Protocol Parameters and Custom Configuration of the Network Access Server Modem FIG. 10 is a flow diagram describing the preferred steps that occur in order to correlate the control signals to protocol parameters and to configure the network access server 30 according to the control signals from the call originator. FIG. 11 illustrates the flow of data and commands through the various modules of the network access server 30 as the steps are carried out.

Referring to both of these figures, the process starts with the call originator generating an incoming call at step one. As the call exits from the call originator, control signals are imparted onto the telephone line at the central office of the telephone company. In the present example, we have assumed that the control signals have been translated by the telephone company into multifrequency tones. An E-lead off-hook or trunk seizure is detected by the telephone interface unit (see FIG. 8).

At step 2, the call connection process described in FIG. 8 is initiated.

At step 3, the call (including the multifrequency tones) is then passed through the telephone interface unit and placed on one of the highways of the time division multiplexed (TDM) bus 74 (see FIGS. 2 AND 3) and routed to a modem in the modem module 76A (or one of the other modem modules).

At step 4, the modem extracts the multifrequency tones. This is accomplished by the modem detecting a multifrequency tone start signal, one or more multifrequency tones that follow the start signal, and then a multifrequency stop signal. Alternatively, the DTMTS are extracted.

At step 5, the modem decodes or converts the multifrequency tones into a data signal, which typically will be in the form of a DNIS (dialed number information system) digit or ANI digit. This step involves decoding the multifrequency tones, typically by looking up the multifrequency tones in a memory and retrieving the designated DNIS digit. Table 2 above shows the relationship between the multifrequency tones and the DNIS digits. In Table 2, KP is the signal that indicates the start of the multifrequency tones. ST is the control signal for the end or stop of the transmission of the multifrequency tones.

Still referring to FIGS. 10 and 11, at step 6, the digital data representing the DNIS digit is passed from the modem to the network application module 82 on the packet bus 99 (see FIGS. 6 and 7).

At step 7, the network application module 82 correlates the DNIS digit to the particular protocol parameters (perhaps associated with a particular AT command string) assigned to the DNIS digit. The network application module 82 accomplishes this by passing the DNIS digit to the application program interface software. In the preferred embodiment of the invention, this software routine interfaces with the resident software of the host system, which takes the DNIS digit, looks up in memory the correct protocol parameters, and return a pointer to a setmode command block which contains specific protocol parameter information assigned to the DNIS digit. The application program interface passes that information to the modem in the modem module 76A. These functions are described in more detail below in connection with the discussion of FIGS. 12–15.

At step 8, the setmode command block (along with the associated command block and command block extension) carrying the protocol parameters is then passed to the application program interface and placed on the packet bus 99 for transmission back to the modem. The protocol parameter may be in the form of preconfigured AT command strings, or in some other form. The modem configures itself according to the protocol parameters, for example by executing the AT command strings in well known fashion. module 82 indicating either successful receipt of the setmode command block, or else a failure to receive the block. In the event of a failure, the network application module 82 software can be designed to resend the command blocks, or instruct the modem to assume a default configuration, or take some other action.

At step 10, assuming that the setmode block was received by the modem, the network application module 82 sends a command to the modem commanding it to answer the call. This step involves the transmission of the appropriate command block discussed below.

At step 11, the modem begins answering the call. See FIGS. 3, 5 and 6 and the accompanying text.

At step 12, the network 52 is notified by the network application module 82 that a call is incoming.

At step 13, the demodulated call is passed though the modem 76, the packet bus 99, the network application module 82 and network interface module 84 to the network 52 for processing by the host computer system 60.

Steps 6 though 10 above can be performed in other ways. The steps discussed above, however, are illustrative of a preferred technique. The steps of correlating the control signals to protocol parameters in these steps can be performed via software within the modem. In other words, the DNIS digits and protocol parameters need not be passed back and forth between the modem and the network application module 82. The important thing is merely that the control signals retrieved from the telephone call be correlated to protocol parameters associated with those control signals, and that the modem is configured according to the protocol parameters. As noted above, that step can be performed by software in the modem or one of the other modules of the network access server 30. The step could also be performed by passing the digital data associated with the control signals (for example the DNIS digit) out through an RS 232 port 80 (FIG. 2) to a stand alone computer, which then takes the digital information, looks up in a table the proper protocol parameters correlating with the digital information, and then passes the protocol parameters (in the form of a setmode command block, AT command string, or otherwise) back to the modem module for execution by the modem.

As a further example of how the correlation of the control signal to the protocol parameter could be performed, the network application module 82 could simply house a memory and a software routine would look up the protocol parameter for the DNIS digit and pass the parameter back to the modem. In this example, there would be no interaction between the software governing the operation of the network access server 30 functions and the software of the host computer system 60. This scenario could be used where the network access server 30 is installed within a host computer system 60, and the network access server resident software is modified to accommodate updates in the protocol parameters due to updates in the equipment, such as modems M1, M2 or M3, adoption of different protocols by the call originator modems M1, M2 or M3, or when new call originators are brought into the system.

However, the embodiment of the invention wherein the host computer system 60 software is residing in the network application module (as described in conjunction with FIGS. 10 and 11) permits a certain amount of flexibility in the design, in that the host computer system 60 itself is able to control the assignment of protocol parameters to the DNIS digits.

B. Usage of Control Signals to Run Specific Application Programs And/Or Route Call to Particular Host System Components The above discussion relates to one use of the control signals—correlation of the control signals to protocol parameters and custom configuration of the network access server modems. It will be appreciated than other uses may be made from the control signals once they have been extracted from the incoming communication. These other uses may occur simultaneous with the configuration of the modem, or completely independently of the modem configuration.

At step 7, the host system software residing in the network application module 82 now has received the particular DNIS digit for the incoming call, and can simultaneously send the DNIS digit and other information extracted by the incoming control signals to the host computer 60 for processing in parallel with the configuration of the modem. This feature allows the host computer system 60 to look up the profile of the call originator, send data or prompts to the call originator, or whatever the user may wish to do with the control signals. Alternatively, once the control signals have been decoded and correlated with a DNIS digit, the host system software (or even network access server resident software) may use the DNIS digit to run specific applications programs, do lookups in a database, or make other customized use out of the control signals for the incoming call. Additionally, the host system software can use the DNIS digit to route the call to particular terminals or other components of the host system on a customized basis, as the control signals are individual to the incoming call.

V. The Interface Between the Application Program Interface Software and the Host System Software and Examples of System Operation All input/output requests are issued to the modems in modules 76A–F via the application program interface software residing in the application interface module 82 of the network access server 30. The requests are processed through a structured set of commands. The architecture employs a command control block (CCB) which contains the command code, modem—ID, and a pointer to an optional command block extension (CBX) which in turn may point to command-specific formatted option blocks such as a setmode option block (SOB) or a listen option block (LOB). The architecture is depicted graphically in FIG. 12.

Multiple commands can be sent to the modem through a chain of CCBs, which can be processed in sequence by the modem before the modem presents a device end (DE) or status signal.

Each CCB can optionally point to a command block extension (CBX) that may further contain additional command options and/or data pointers. The CBX may further point to an option block which contains command specific data. For example, for a setmode command, the CBX points to a setmode option block (SOB). For a listen command the CBX points to a listen option block (LOB) into which the application software for the network access server 30 will return start-of-call information.

For input/output requests with chained CCBs, only one channel end (CE) and one device end (DE) will be presented by the application software for the multiple CCBs.

The host computer system software will issue the input/output calls to the resident network access server software by pointing to a structured command control block (CCB). The application program interface software, upon receiving pointer to the command, will return a channel end (CE) condition, which will only be an indication of whether the command was accepted or rejected. This CE is not an indication of the completion or execution of the command. If the command is accepted, that is, if the CE of "command accepted" is returned to the host computer system software, the command is passed to the target modem which will attempt to execute the command and upon completion (whether successful or unsuccessful) will present the appropriate device end signal (DE) to the host computer system software. The DE, along with additional reason codes, will be included in the last command block extension which the modem executed. The return command block extension is placed in a mailbox, which is waited upon by the host computer system software.

The command control blocks (CCB's) and command block extensions (CBX's) of FIG. 12 are shown in more detail in FIGS. 13 and 14 respectively. In FIG. 13, the numbers +0, +4, +8, etc. indicate the number of bytes the various fields of the block are offset from the beginning of the block. The first block in command control block of FIG. 13 is a signature block which identifies the block as a command control block. The remaining blocks of the command control block of FIG. 13 and the command block extension of FIG. 14 are described in Table 3.

TABLE 3

| Command Control Block (CCB) | | |
|---|---|---|
| Parameter Name | Description | Possible Values |
| CCB_CMD | Command Code | Codes for one of the modem commands, for example, ANSWER, SETMODE, LISTEN |
| CCB_MID | Target modem ID | 1–24 or 48, the number of the target modem. |
| CCB_FLAGS | CCB specific flags | Codes for whether CCB are linked in a chain |
| CCB_CBX | Pointer to a CBX | For Intel 80486 architecture, a pointer into the data segment is six bytes long for the COMPACT memory model |
| CCB_CCB | Pointer to next CCB in chain | see above |
| CCB_DE | Completion (Device End) status | Codes for command executed, abnormal end, system error, etc. |
| CCB_RC | Reason Code | Codes for reasons why commands not executable |

TABLE 3-continued

| Command Control Block (CCB) | | |
|---|---|---|
| Parameter Name | Description | Possible Values |
| CCB-RCX | Additional Reason Code | Additional error codes |
| CBX_FLAGS | CBX specific flags | Codes for flags, such as whether buffer blocks are populated |
| CBX_BCOUNT | byte count | number of bytes: 1) to receive, 2) to send, or 3) size of FOB (Format Option Block) |
| CBX_BUFF_FOB | pointer to XMIT/RECV buffer or FOB | For Intel 80486 architecture, a pointer into the data segment is six bytes long for the COMPACT memory model |
| CBX_TIMER1 | timer 1 in milliseconds | Used for delay times in listen, transmit and receive operations |
| CBX_TIMER2 | timer 2 in milliseconds | Additional delay times |

The purpose of the command block extension (FIG. 14) is to pass additional parameters to the target modem and to point to specific option blocks such as the setmode option block of FIG. 12. The field CCB_CBX of the command control block (FIG. 13) addresses the particular command block extension that may be associated with the command control block of FIG. 14. In the CBX of FIG. 14, the address of any further format option block or setmode option block is found at the field beginning with the fourth byte, including the fourth, fifth, sixth and seventh bytes in the command block extension. The format option block or setmode option block pointed to in the CBX contains additional protocol parameters that are passed to the target modem. For example, the pointer in the CBX of FIG. 14 points to a setmode option block which contains the protocol parameters for the modem that is associated with the DNIS digit (decoded by the modem from the control signals or MF tones).

The overall command block structure of the various command functions is shown in FIG. 15. The commands on the left-hand side of FIG. 15, listen, setmode, answer, and possibly various other commands, are generic functions which are provided to the user by the resident software in the network application module 82. The listen, setmode and answer commands are used in the call connection and modem configuration process. For example, the setmode command involves the filling out of parameters in the first command control block, which has a pointer to a command block extension, which in turn points to a specific setmode option block (SOB). The setmode option block is specific to the particular multi-frequency control signal detected by the modem and its associated DNIS digit. Once the particular setmode option block is pointed to by the host computer system application software, those commands are in turn passed from the application program interface software of the network application module 82 back to the modem in module 76A, which in turn executes the protocol parameters contained in the setmode option block.

Prior to the receipt of a call, a listen command (FIG. 15) from the network application module 82 to a modem of the modem modules 76A will have placed the modem in a ring monitor state. When there is no incoming call and the idle pattern is being transmitted by the modem onto the T1 line 51, the listen command is pending on the modem. At the end of every connect cycle, the listen option block (LOB) is updated network application module 82 with the data associated with the incoming control signals from the incoming calls, such as the DNIS digit, and the Listen Option Block is passed to the host computer system software. The host computer system software in the network application module 82 takes the data returned in the listen option block and looks up in a table in a memory the corresponding command parameters for the data and sets a pointer to a setmode option block for that data. The application program interface takes the setmode option block (and its associated CCB and CBX), passes the blocks to the packet bus handler of the network application module 82, which then places the blocks on the packet bus 99. The protocol parameters in the setmode block are then routed back to the modem.

The listen option block (LOB) (FIG. 15) may have the following structure. The block may have a field at offset two bytes, wherein the data representing the DNIS number is stored. Other fields may be provided for the Feature Group D control signal data, such as the ANI number. Still other fields could store data representing other control signals imparted on the T1 line 51 and decoded in the modem module 76A.

As mentioned previously, the host computer system software takes the DNIS number returned in the listen option block, looks up in a table the appropriate protocol parameters associated with that DNIS number and then sets a pointer to a particular setmode option block. The host computer system software will have previously determined which setmode block should correspond with a particular DNIS number. A setmode block tells the modem about the synchronization mode, character grouping, modulation technique and various other protocol dependent parameters of the incoming communication. For the setmode command, the CCB command block points to a CBX which in turn points to a particular formatted option block which contains the protocol dependent parameters. FIG. 15 shows the overall architecture of the setmode command.

The setmode option block layout may consist of 16 words of data, 16 bits of data per word. The block can be broken down into particular fields as in the case of the CCB of FIG. 13 and the CBX of FIG. 14. The fields are filled out with data which are associated with particular modulation techniques (for example, Bell 103, Bell 212, V.22 bis, V 32, Bell 208 and high speed asynchronous transmission). Other fields will contain data corresponding to whether the call is synchronous or asynchronous, and whether full duplex communication is used. Still other fields can be associated with particular error correction techniques. Other fields can be devoted to the number of characters per bit, number of stop bits, pointers to AT command set strings, synchronization insert timers, and change of direction characters which implement protocol spoofing (described below).

When the various fields of the setmode option block are passed from the network application module 82 on the packet bus 99 back to a modem in module 76A, the modem parses the fields of the setmode option block and implements the commands in the fields. Once the parameters have been passed to the modem and the modem executes those parameters, the modem is then in condition for demodulation of the incoming call and passage of the call through the network access server 30 to the host computer system 60. The answer command (see FIGS. 10, 11 and 15) commands the modem to answer and perform these functions.

Figure 16:
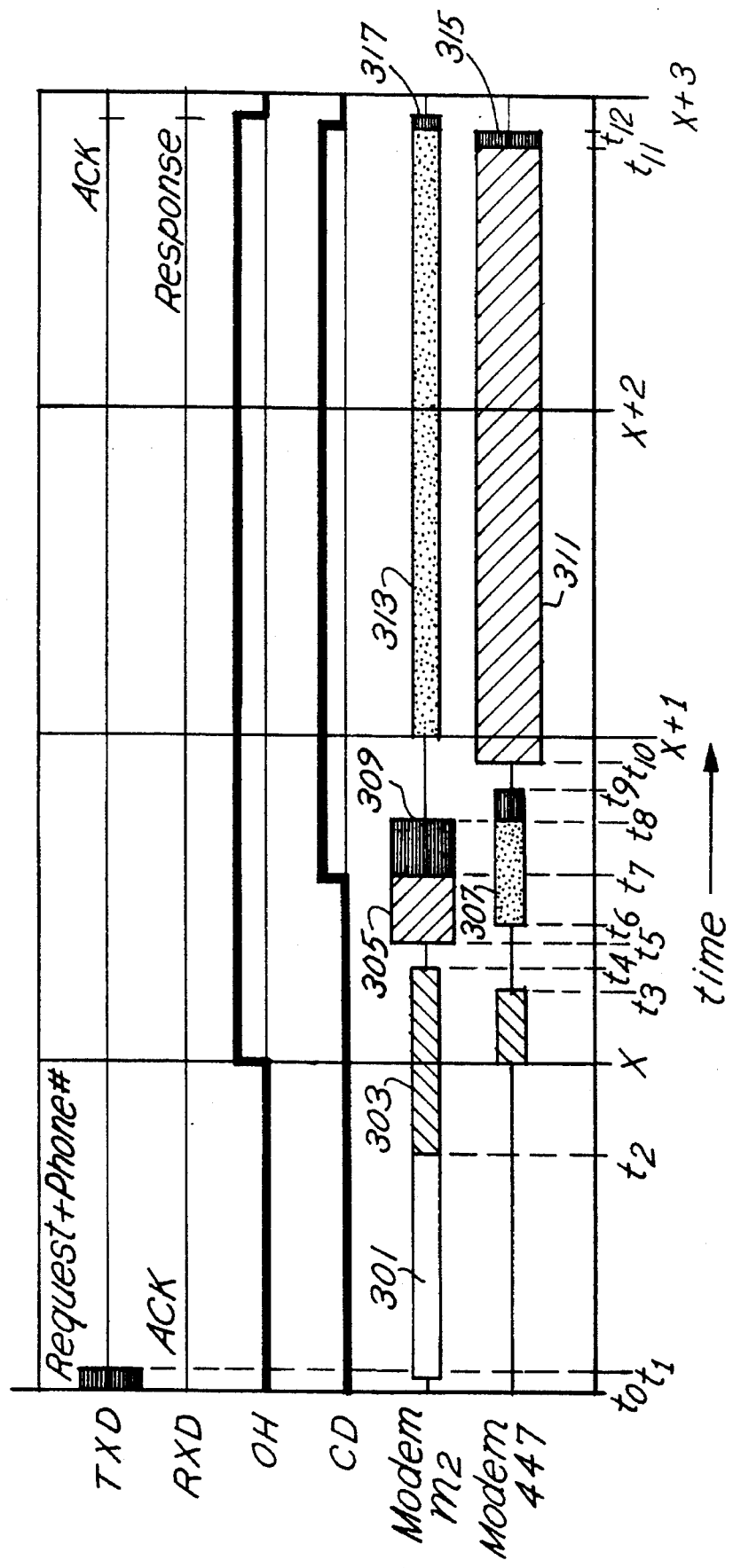
FIG. 16 is a diagram of the timing signals and communications modes used during the asymmetrical transmission feature of the present invention.

Referring now to FIG. 16, a timing diagram illustrates the reduced transaction time when high speed asynchronous transmission is used between the call originator modem M2 and the modem of the network access server 30. This technique is particularly useful when the call originator is a credit card swipe as shown as swipe 36 in FIG. 1. In FIG. 16, TXD represents the transmit data from the credit card swipe 36 to the modem M2. RXD represents the response signal from the modem M2 to the credit card swipe 36 indicating that it has received the transmitted data from the credit card swipe 36. OH is the off-hook signal sent by the modem M2 to the network access server 30. CD is the carrier detect signal which is sent by the modem M2 to the network access server 30. Off hook indicates when the answering modem becomes connected to the phone line. Carrier detect indicates when the answering modem is in a connected state and is transmitting and receiving data with the remote modem. For this example, modem 447 contained in modem module 76A (FIG. 6) is chosen to be the receiving modem in the network access server 30.

At time $T=t_0$, the credit card swipe 36 transmits data, generally referred to as a credit card request, plus the phone number that it is dialing to the modem M2. The credit card request may include such information as the credit card number, the amount of the transaction, and possibly further information such as an identification of the store that originated the transaction or the clerk's identification code. The modem M2 acknowledges the receipt of the credit card transaction request at the time $t_1$ and the transmitting modem M2 initiates the dialing tone pattern 301. At time $t_2$, the transmitting modem M2 begins inputting a fast connect tone pattern 303. Control signals (multi-frequency tones) are imparted onto the telephone line by the telephone company network 50 (FIG. 1) during the time period between $t_1$ and $t_2$.

Between $t_2$ and time X, the receiving modem 447 is receiving the multi-frequency tones and is decoding the tones and converting these control signals into protocol parameters for configuration of the modem. (See FIGS. 8, 10, 11). In this example, the multi-frequency tones include a separate control signal indicating that a credit card verification technique is being used, and the network application module 82 retrieves a setmode command block having a field with a command associated with general credit card verification transmission protocols.

At time X, the modem 447 begins sending anwer tones associated with the general credit card verification protocols. It then detects the fast connect tones 303 and stops transmitting the answer tones at $t_3$. This tells the remote modem, M2, that the high-speed asynchonous transmission format is suitable for both the transmitting and receiving modems. At time $t_4$, the modem M2 stops transmitting the fast connect tones, pauses a brief interval, and at time $t_5$ initiates the high-speed training communication 305, sending training data at high speed to the receiving modem. The modem 447 is placed in a very low speed transmitting mode and transmits the low speed training pattern 307 at time $t_6$. At time $t_7$, the modem M2 transmits the credit card request 309 at high speed to modem 447. At time $t_8$, the modem M2 receives the acknowledgement from modem 447, indicating that the credit card request has been correctly received by modem 447. At time $t_9$, modem 447 sends an acknowledgement signal to modem M2 acknowledging the receipt of the high-speed credit card request, and simultaneously sends the credit card request through the network access server 30 to the local area network 52 (FIG. 1).

At time $t_9$, the modem M2 and modem 447 reverse the speed of their receive and transmitting states, and at time $t_{10}$, the modem 447 begins sending to the modem M2 a high-speed training signal 311. Upon receiving the high speed training sequence, the modem M2 transmits a low-speed training signal 313 and is simply waiting for the credit card response to come back from the modem 447. During the time between $t_{10}$ and $t_{11}$, the host computer system is processing the credit card request, and both modems M2 and 447 are in a holding patterns waiting for the receipt of the response. The modem M2 is transmitting at a very low speed while the modem 447 is transmitting at a very high speed.

At time $t_{11}$, the network access server 30 receives a response from the host system 60 to the credit card request, and transmits a response 315 through the modem 447 to the transmitting modem M2. At time $t_{12}$, the modem M2 receives the request response and in turn sends an acknowledgement 317 to modem 447. The response is transmitted from the modem M2 to the credit card swipe terminal 36, which then issues an acknowledgement signal shortly thereafter. The acknowledgement 317 is then forwarded to the host computer system indicating a successfully completed transaction. The carrier detect (CD) and off-hook (OH) signals both go to a low state shortly thereafter and the call is completed at time X+3. Using the techniques shown in FIG. 16, the total time, from the receipt of the fast-connect tones at time X at the network access server 30 to the completion of the call at time X+3, is three seconds. By using this high-speed asynchronous transmission scheme, the transaction processing time is substantially reduced from prior art techniques. The present invention allows a network access server 30 to take control signals from the telephone line and correlate them with protocol parameters for this mode of transmission. The high-speed asynchronous communications technique is described in more detail in U.S. Pat. No. 4,890,316, which is incorporated by reference herein.

Yet another technique by which a network access server 30 of the present invention may configure the modems therein according to the communications protocols of the call originators is shown in FIG. 17. FIG. 17 describes a technique known as "spoofing", wherein the network access server modem (e.g., modem 447) deceives the transmitting modem from the call originator (e.g., modem M2) by prematurely sending a signal, for example, an acknowledgement signal, to the call originator modem to cause the call originator to commence data transfer earlier in time than it otherwise would. The call originator modem receives the acknowledgement signal early, thereby advancing the transmission of the data (such as a credit card request). The technique of FIG. 17 is particularly suitable for credit card transactions, but is applicable to other types of transmissions.

Since the particular protocol for completing calls varies according to the type of call, modems in the network access server may need to issue different protocol spoofing signals. Thus, the extracted control signal, decoded and converted into digital data such as a DNIS digit, can be associated with a particular protocol spoofing routine depending on the identity or classification of the call originator.

The spoofing technique is implemented in modem 447 when the control signals imparted on the line correspond to a particular DNIS digit associated with the spoofing technique. When the DNIS digit is passed from the modem 447 to the network application module 82, the network application module 82 receives from the host computer system software a pointer to a particular setmode option block that has a field having control characters corresponding to the spoofing protocol, such as change of direction commands. In the example of a credit card transaction, when those protocol parameters are passed back to the modem 447, the modem 447 may follow the flow of signals according to FIG. 17.

Referring to FIG. 17, at time $t_0$ the remote modem M2 (FIG. 1) transmits an enquire signal to the network access server 30 which is received by the modem 447 at time $t_1$. At time $t_1$, the modem 447 sends an early acknowledgement signal back to the remote transmitting modem M2. Also at $t_1$, the modem transmits the enquire signal from the remote modem M2 on to the host computer system 60. At time $t_2$, the host computer system 60 receives the enquire signal and sends back an acknowledgement signal which is discarded by modem 447. However, the acknowledged signal from modem 447 sent at $t_1$ is received by the modem M2 at time $t_3$. The modem M2 does not care whether the acknowledgment signal originated from the modem 447 or had originated from the host computer system 60. At time $t_3$, the modem M2 sends the credit card request to the host computer system 60.

At time $t_4$, the acknowledgement signal from the host computer system 60 is intercepted by the modem 447, which, as noted above, then discards the acknowledgement signal. There is no need to transmit that acknowledgement signal back to the modem M2 because the remote modem has already received the acknowledgement signal at time $t_3$.

Between times $t_4$ and $t_5$, the credit card request is sent from the modem 447 to the host computer system 60. At time $t_5$, the host computer system 60 sends a response back to the modem M2, which receives the response at time $t_7$. At time $t_7$, the call has been completed.

The events during the time that would have elapsed if the spoofing technique was not used as shown in the dashed lines in FIG. 17. Specifically, at time $t_4$, if the modem 447 had not discarded the acknowledgement signal from the host computer system 60, it would have simply passed that acknowledgement signal on to the modem M2, which would have been received by the modem M2 at time $t_8$. At time $t_6$, the modem M2 would have sent the credit card request signal back to the host system 60, which would have been received at time $t_8$. The host computer system 60 would have sent the response to the modem M2, which would have been received at time $t_9$.

The total time saving using the spoofing technique described herein is a difference in time between time $t_9$ and time $t_7$. This time savings can be significant, particularly when thousands or even millions of credit card requests are incoming to a network access server per year. It will also be appreciated that the protocol spoofing described in FIG. 17 can be used for other types of incoming calls. The key concept described in FIG. 17 is the deceiving of the remote modem by sending an acknowledgement or other signal early from the modem 447 to the modem M2, to thereby initiate early transmission of the credit card request (or other data communication) from the modem M2 to the host computer system 60. The present invention allows a network access server to configure itself to achieve this result by correlating a control signal from the incoming call to a spoofing protocol parameter, and then executing that parameter in a modem.

VI. Conclusion

From the foregoing detailed description, it will be appreciated that numerous changes and modifications can be made to the hardware and software aspects of the invention without departure from the true spirit and scope of the invention. For example, the present invention is not dependent upon the type of incoming call originator. Lottery ticket terminals may be the source of the incoming calls. The terminals would transmit the numbers of the lottery ticket sales to the central lottery computer. Furthermore, the control signals may identify the communications protocol to be used by the call originator by the telephone number dialed, the telephone number of the call originator, or by other means. The term "multifrequency tones", as used in the claims, is intended to encompass both MF and DTMF multifrequency tones. The invention can be used for credit card transactions, high speed data transfers from remote computers, lottery ticket transactions, and other types of data communications. This true spirit and scope of the invention is defined by the appended claims, to be interpreted in light of the foregoing specification.

We claim:

1. In a communication processing system having a network access server and a memory storing a communication protocol parameter associated with control signals identified with incoming communications generated by remotely located call originators, said network access server comprising a modem, a method for processing said incoming communications between said call originators and a computer network comprising the steps of:

(a) initiating a connection between a remotely located call originator and said network access server;

(b) extracting one or more control signals from an incoming communication generated by said call originator, said control signals comprising multifrequency tones, said step of extracting said control signals comprising the steps of transmitting said multifrequency tones to said modem and decoding said multifrequency tones, wherein said step of decoding said multifrequency tones comprises the steps of
  detecting a multifrequency tone initiation signal;
  detecting a multifrequency tone;
  looking up in a table a digit assigned to said multifrequency tone and assigning said digit to said multifrequency tone; and
  detecting a multifrequency tone stop signal;

(c) correlating said control signals to said protocol parameter assigned to said control signals; and (d) configuring said network access server according to said protocol parameter;

whereby said incoming communication is routed through said network access server to said network according to said protocol parameter, reducing the overall communication connection and processing time.

2. In a communication system processing incoming communications generated by remotely located call originators and having a network access server, said network access server having a modem paired to a remotely located call originator to enable high speed asymmetrical data communication therebetween, said network access server having a memory storing a communication protocol parameter associated with said high speed asymmetrical data communication, a method for processing said incoming communications between said call originators and said network access server comprising the steps of:
  (a) initiating a connection between said call originator and said network access server;
  (b) extracting one or more control signals from an incoming communication generated by said call originator, wherein said control signals comprise multifrequency tones, and wherein said step of extracting said control signals comprises the steps of:
    detecting a multifrequency tone initiation signal;
    detecting a multifrequency tone;
    looking up in a table a digit assigned to said multifrequency tone and assigning said digit to said multifrequency tone; and
    detecting a multifrequency tone stop signal;
  (c) converting said control signals to a protocol parameter stored in said memory assigned to said control signals;
  (d) configuring said network access server according to said protocol parameter; and
  (e) initiating said high speed asymmetrical data communication;

whereby the overall communication connection and processing time of said incoming communication is reduced.

3. In a communication system processing incoming communications generated by remotely located call originators and having a network access server, said network access server having a modem paired to a remotely located call originator to enable high speed asymmetrical data communication therebetween, wherein said communication system further comprises a network linked to said network access server, wherein said network access server further comprises a network application module, said network access server having a memory storing a communication protocol parameter associated with said high speed asymmetrical data communication, a method for processing said incoming communications between said call originators and said network access server comprising the steps of:
  (a) initiating a connection between said call originator and said network access server;
  (b) extracting one or more control signals from an incoming communication generated by said call originator, wherein said control signals comprise multifrequency tones, and wherein said step of extracting said control signals comprises the steps of
    detecting a multifrequency tone initiation signal;
    detecting a multifrequency tone;
    looking up in a table a digit assigned to said multifrequency tone and assigning said digit to said multifrequency tone; and
    detecting a multifrequency tone stop signal;
  (c) converting said control signals to a protocol parameter stored in said memory assigned to said control signals; wherein the step of converting said control signals to said protocol parameter stored in said memory assigned to said control signals comprises the steps of:
    passing digital data representing said control signals from said modem to said network application module;
    looking up in said memory said protocol parameter corresponding to said digital data; and
    passing said protocol parameter from said network application module to said modem;
  (d) configuring said network access server according to said protocol parameter; and
  (e) initiating said high speed asymmetrical data communication;

whereby the overall communication connection and processing time of said incoming communication is reduced.

4. In a system comprising a remotely located modem, said modem linked to a network access server over a telephone line, said network access server linked to a host computer system, a method for processing a credit card transaction comprising the steps of:

initiating a call from said modem to said network access server;

inputting predetermined control signals onto said telephone line carrying said credit card transaction, wherein said control signals comprise multifrequency tones;

extracting said control signals from said call, wherein the step of extracting said control signals comprises the steps of:

detecting a multifrequency tone initiation signal;
  detecting a multifrequency tone;
  looking up in a table a digit assigned to said multifrequency tone and assigning said digit to said multifrequency tone; and
  detecting a multifrequency tone stop signal;

correlating said control signals to predetermined protocol parameters assigned to said control signals, and spoofing said modem, said step of spoofing comprising the steps of (i) receiving a first signal from said modem at said network access server and passing said first signal to said host computer system;
  (ii) responsively sending a second signal from said network access server to said modem, causing said modem to initiate transmission of said credit card transaction;
  (iii) said host computer sending a third signal to said network access server in response to said first signal;
  (iv) intercepting said third signal from said host computer system;

whereby the communication processing time of said credit card transaction is reduced.

5. In a communication processing system having a network access server and a memory storing a routing parameter associated with a routing path for incoming communications generated by remotely located call originators, said network access server comprises a modem, a method for routing said incoming communications between said call originators and a host computer system comprising the steps of:

(a) initiating a connection between a call originator and said network access server;

(b) extracting one or more control signals from and an incoming communication from said call originator, said control signals comprising multifrequency tones, the step of extracting said control signals comprising the steps of:

transmitting said multifrequency tones to said modem; and
  decoding said multifrequency tones; wherein said step of decoding said multifrequency tones comprises the steps of
  detecting a multifrequency tone initiation signal;
  detecting a multifrequency tone;
  looking up in a table a digit assigned to said multifrequency tone and assigning said digit to said multifrequency tone; and
  detecting a multifrequency tone stop signal;

(c) correlating said control signals to said routing parameter assigned to said control signals; and (d) routing said incoming communication to a particular destination in said host computer system according to said routing parameter.

* * * * *